United States Patent
Nakahara

(10) Patent No.: US 8,891,121 B2
(45) Date of Patent: Nov. 18, 2014

(54) INFORMATION PROCESSING SYSTEM FOR RESETTING OF CONFIGURATION DATA

(71) Applicant: Canon Kabushiki Kaisha, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 13/675,371

(22) Filed: Nov. 13, 2012

(65) Prior Publication Data
US 2013/0155451 A1 Jun. 20, 2013

(30) Foreign Application Priority Data
Dec. 16, 2011 (JP) ................................. 2011-275786

(51) Int. Cl.
| | | |
|---|---|---|
| *G06F 15/00* | (2006.01) | |
| *G06K 1/00* | (2006.01) | |
| *G06F 3/12* | (2006.01) | |
| *G06K 15/00* | (2006.01) | |
| *H04L 12/24* | (2006.01) | |

(52) U.S. Cl.
CPC ............ *G06K 15/40* (2013.01); *H04L 41/0846* (2013.01); *G06F 3/1231* (2013.01); *H04L 41/0883* (2013.01); *G06F 3/1204* (2013.01); *H04L 41/0866* (2013.01); *G06F 3/1288* (2013.01)
USPC ........................... 358/1.15; 358/1.13; 358/1.9

(58) Field of Classification Search
None
See application file for complete search history.

(56) References Cited

U.S. PATENT DOCUMENTS

| | | | |
|---|---|---|---|
| 5,857,073 A | | 1/1999 | Tsukamoto et al. |
| 8,405,861 B2* | | 3/2013 | Kobayashi et al. ........... 358/1.15 |
| 2003/0041133 A1 | | 2/2003 | Hiroshige et al. |
| 2003/0053106 A1* | | 3/2003 | Kuroda et al. ................ 358/1.13 |
| 2004/0090649 A1* | | 5/2004 | Minagawa .................... 358/1.15 |
| 2005/0052660 A1* | | 3/2005 | Sabbagh et al. ................ 358/1.1 |
| 2006/0242272 A1 | | 10/2006 | Furukawa |
| 2007/0300216 A1* | | 12/2007 | Miyagi .......................... 717/168 |
| 2008/0244043 A1* | | 10/2008 | Kawai ............................ 709/221 |
| 2009/0316180 A1* | | 12/2009 | Nakagawa .................... 358/1.14 |
| 2011/0205581 A1* | | 8/2011 | Machii et al. ................. 358/1.15 |

FOREIGN PATENT DOCUMENTS

| | | |
|---|---|---|
| EP | 1643682 A2 | 4/2006 |
| EP | 1976189 A2 | 10/2008 |
| EP | 2161876 A1 | 3/2010 |
| JP | 2006-099362 A | 4/2006 |
| JP | 2007-130838 A | 5/2007 |
| JP | 2009175983 A | 8/2009 |

OTHER PUBLICATIONS

European Search Report issued in corresponding application No. 12008351.4 dated Jul. 22, 2013.

* cited by examiner

*Primary Examiner* — Ming Hon
(74) *Attorney, Agent, or Firm* — Carter, DeLuca, Farrell & Schmidt, LLP

(57) ABSTRACT

The setting management service determines whether or not to hand over configuration data before being replaced to an image forming apparatus after being replaced based on a changed content of device configuration information of the image forming apparatus after being replaced and a handover condition associated with configuration data of the image forming apparatus when the image forming apparatus is replaced, and specifies a setting item required for a reset based on a content of a change flag indicating whether or not a user has changed a setting of configuration data from an initial value to thereby notifies the specified setting item to the image forming apparatus when configuration data is not handed over. The image forming apparatus that has received the notification displays a screen that prompts a reset of the setting item required for the reset.

12 Claims, 16 Drawing Sheets

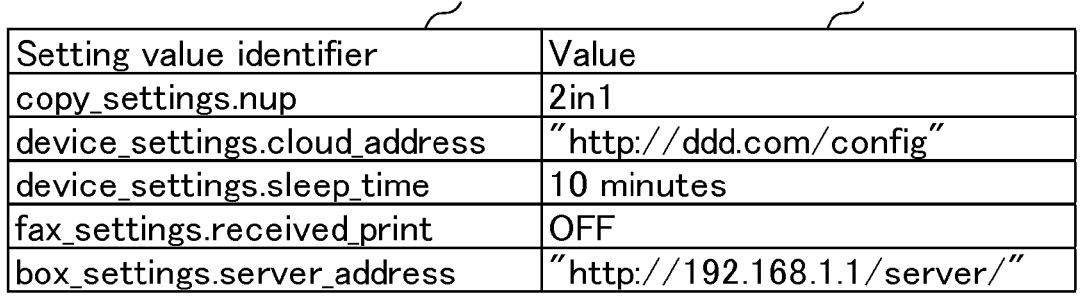

FIG. 4A

| Setting value identifier | Value |
|---|---|
| copy_settings.nup | 2in1 |
| device_settings.cloud_address | "http://ddd.com/config" |
| device_settings.sleep_time | 10 minutes |
| fax_settings.received_print | OFF |
| box_settings.server_address | "http://192.168.1.1/server/" |

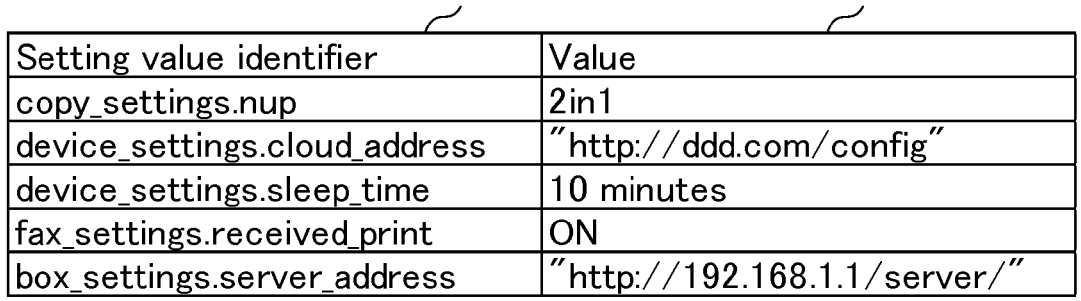

FIG. 4B

| Setting value identifier | Value |
|---|---|
| copy_settings.nup | 2in1 |
| device_settings.cloud_address | "http://ddd.com/config" |
| device_settings.sleep_time | 10 minutes |
| fax_settings.received_print | ON |
| box_settings.server_address | "http://192.168.1.1/server/" |

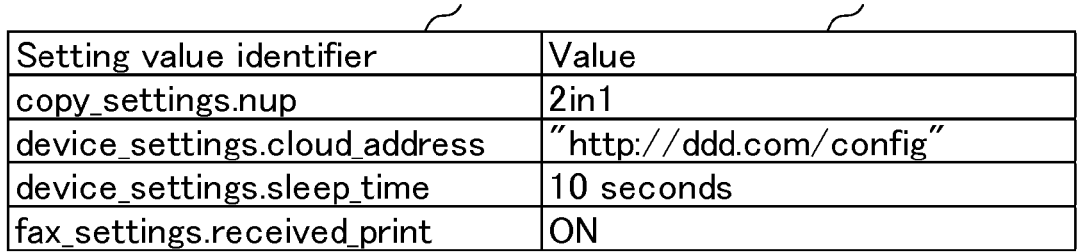

FIG. 4C

| Setting value identifier | Value |
|---|---|
| copy_settings.nup | 2in1 |
| device_settings.cloud_address | "http://ddd.com/config" |
| device_settings.sleep_time | 10 seconds |
| fax_settings.received_print | ON |

FIG. 7A

| Set value identifier | Default value | Value range | Condition |
|---|---|---|---|
| copy_settings.nup | 1in1 | 1 in 1, 2 in 1, 4 in 1 | None |
| device_settings.cloud_address | "http://ddd.com/config" | 256 bytes | None |
| device_settings.sleep_time | 10 minutes | 1 minute, 10 minutes, 1 hour | |
| fax_settings.received_print | OFF | ON, OFF | Facsimile unit |
| box_settings.server_address | "" | 256 bytes | None |

FIG. 7B

| Set value identifier | Default value | Value range | Condition |
|---|---|---|---|
| Copy_settings.nup | 1in1 | 1 in 1, 2 in 1, 4 in 1 | None |
| Device_settings.cloud_address | "http://ddd.com/config" | 256 bytes | None |
| Device_settings.sleep_time | 10 seconds | 10 seconds, 1 minute, 10 minutes, 1 hour | None |
| Fax_settings.received_print | OFF | ON, OFF | Facsimile unit |

FIG. 11A

| Setting value identifier | Initial value | Operational value | Type | Size | Handover condition | Change flag |
|---|---|---|---|---|---|---|
| Key1 | | | | | None | 1 |
| Key2 | | | | | None | 0 |
| Key3 | | | | | Force | 1 |
| Key4 | | | | | Force | 0 |
| Key5 | | | | | Tray_Bin | 1 |
| Key6 | | | | | Tray_Bin | 0 |
| Key7 | | | | | Color_Type | 1 |
| Key8 | | | | | Color_Type | 0 |

| Handover condition | Detail |
|---|---|
| None | Reconfigure setting without automatical handover |
| Force | Hand over setting in any condition |
| Tray_Bin | Not hand over but reconfigure setting when the structure of paper feeding and delivering stage is changed |
| Color_Type | Not hand over to device of which color/monochrome function is different but reconfigure setting |

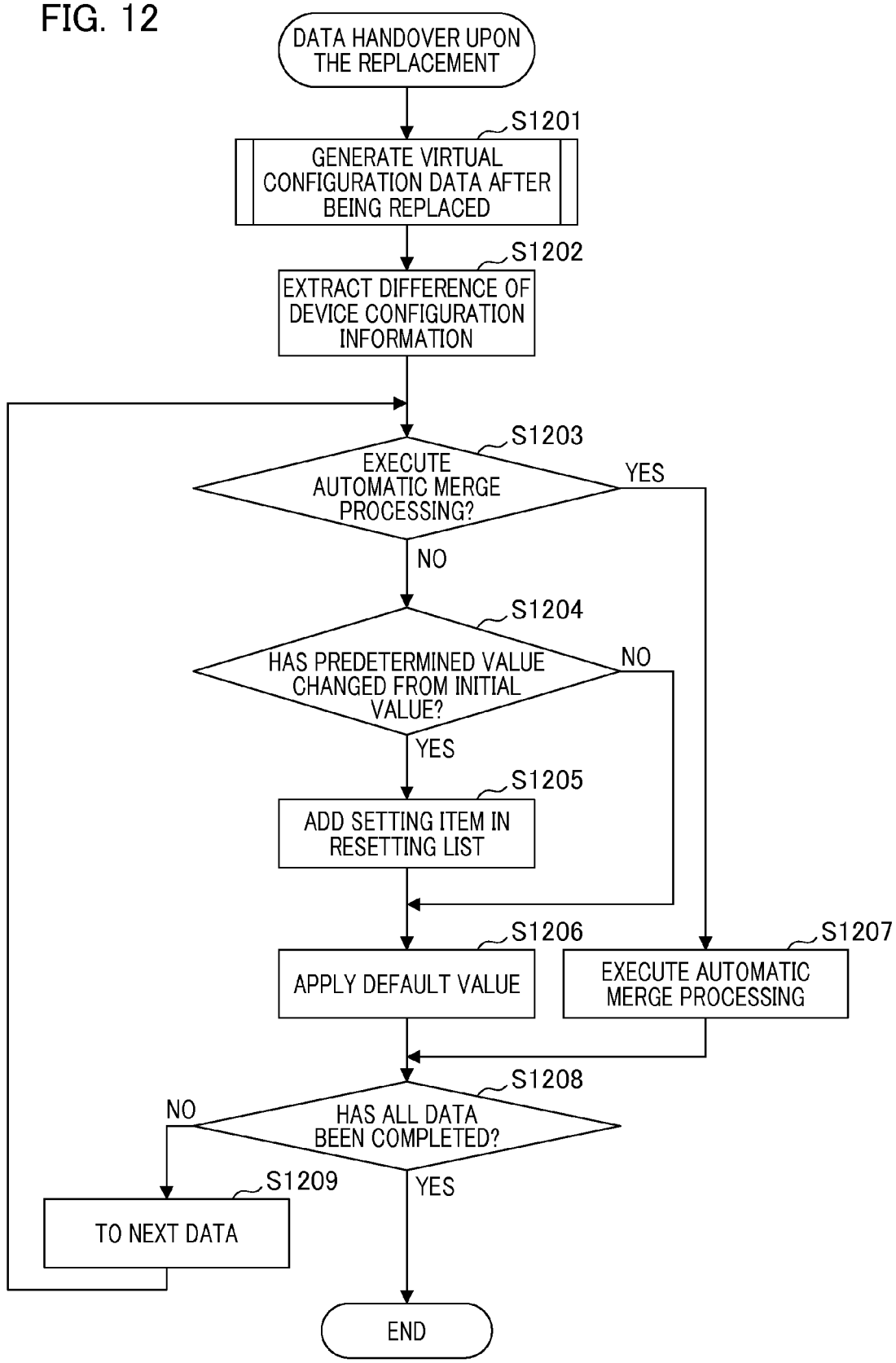

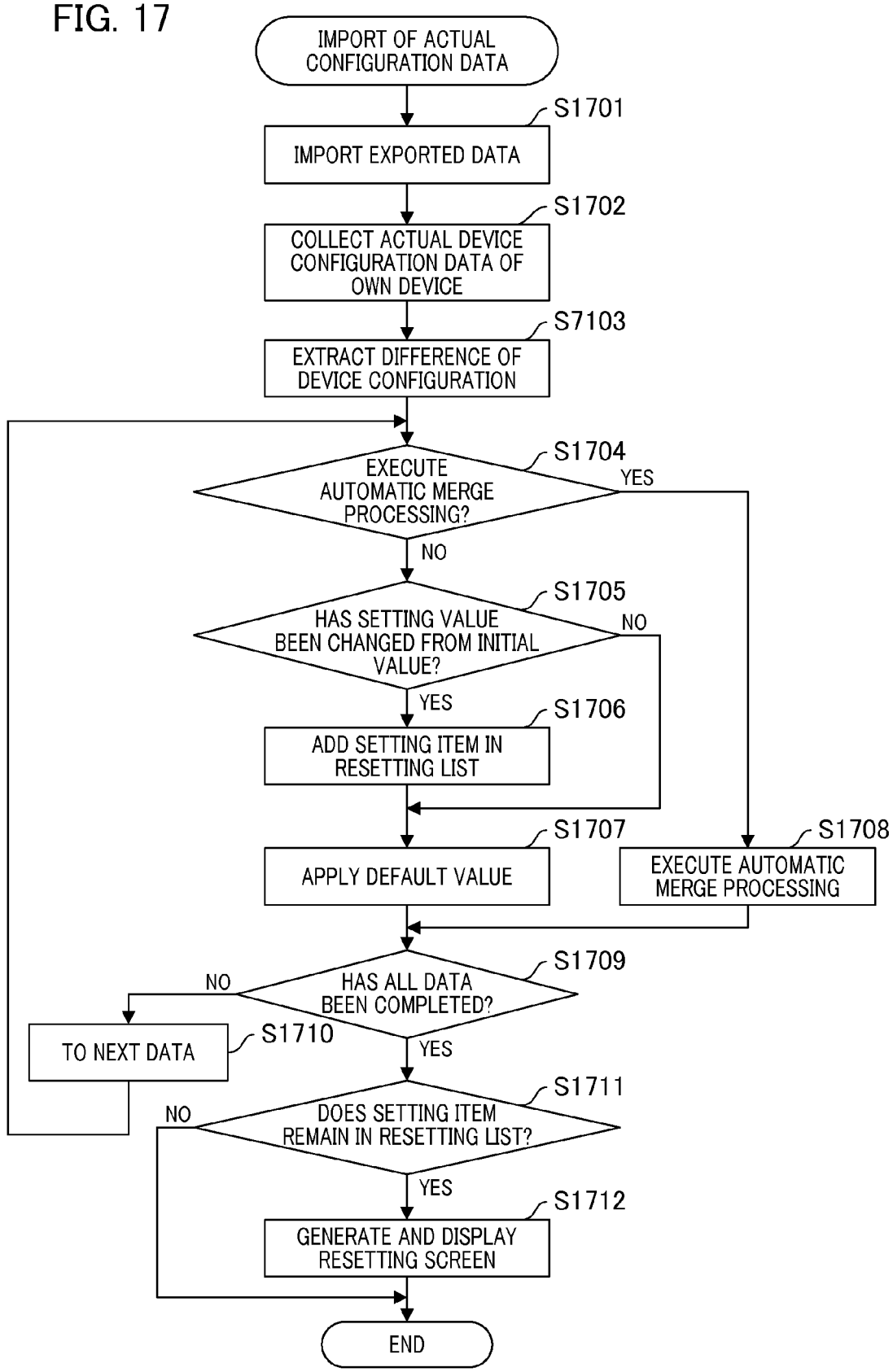

INFORMATION PROCESSING SYSTEM FOR RESETTING OF CONFIGURATION DATA

BACKGROUND OF THE INVENTION

1. Field of the Invention

The present invention relates to an information processing system, an image forming apparatus, a management method, and a storage medium.

2. Description of the Related Art

There has been proposed an image forming apparatus that stores configuration data in a storage unit. The configuration data is setting information (operation setting information) for switching the operation of the image forming apparatus. Since configuration data is stored in the storage unit provided in each of the image forming apparatuses, the setting changes in configuration data need to be made by the number of image forming apparatuses in order to change configuration data for all of image forming apparatuses.

For saving the time and required for changing the settings of configuration data by the number of image forming apparatuses, there has been proposed a technology in which the settings of configuration data for a plurality of image forming apparatuses are made at one time by a certain information processing apparatus. For example, Japanese Patent Laid-Open No. 2007-130838 discloses an image forming system in which a plurality of image forming apparatuses, to which the initial setting operation has been performed, downloads initial system setting information from a server and reflects the downloaded initial system setting information to the initial setting content.

Also, it is assumed that configuration data is handed over when the image forming apparatus is replaced. When configuration data of the image forming apparatus before being replaced is handed over to the image forming apparatus after being replaced, for example, configuration data set is collectively reflected on the image forming apparatus after being replaced in. However, depending on a changed content of a hardware or software configuration status of the device, configuration data of the image forming apparatus before being replaced may not be directly handed over to the image forming apparatus after being replaced.

Japanese Patent Laid-Open No. 2006-099362 discloses a setting data transmission program that compares new setting data to be set in a device of target with predetermined setting data, to thereby display the comparison result, and transmits new setting data to the device of target in response to an instruction from a user.

There is a case in which direct handover to image forming apparatus after being replaced is not appropriate with respect to configuration data that is subject to the restriction of a value because a model of the image forming apparatus or a hardware option provided with the image forming apparatus affect configuration data. However, the technology disclosed in Japanese Patent Laid-Open No. 2007-130838 is employed, configuration data is handed over regardless of the changed content of device configuration information of the image forming apparatus as a result of replacement. Also, when the technology disclosed in Japanese Patent Laid-Open No. 2006-099362 is applied, configuration data before being replaced is compared with configuration data after being replaced, a comparison result is displayed in a screen, and handover of configuration data is performed depending on an instruction by a user that saw the screen. However, this handover processing is inefficient as well as burden to the user.

SUMMARY OF THE INVENTION

A system of the present invention displays a screen that prompts a resetting with respect to configuration data that is not appropriate to hand over to the image forming apparatus after being replaced depending on a changed content of device configuration information accompanied with replacement of the image forming apparatus, to thereby reduce user's burden.

The information processing system of an embodiment according to the present invention includes an image forming apparatus, and a management apparatus that manages operation setting information for switching an operation of the image forming apparatus. The management apparatus comprises a generating unit configured to generate operation setting information for applying to the image forming apparatus; a transmitting unit configured to transmit the generated operation setting information to the image forming apparatus via a network. The generating unit determines for each setting item whether or not to hand over a setting of first operation setting information indicating operation setting information corresponding to the image forming apparatus before being replaced to a setting of second operation setting information indicating operation setting information corresponding to the image forming apparatus after being replaced, and further determines whether or not the setting item not to be handed over to the second operation setting information as a result of determination is required for reset. The transmitting unit transmits the generated operation setting information for applying to the image forming apparatus after being replaced and the setting item required for the reset determined by the generating unit to the image forming apparatus after being replaced via the network. The image forming apparatus comprises a setting information acquiring unit configured to acquire the operation setting information for applying to the image forming apparatus and the setting item required for the reset from the transmitting unit provided in the management apparatus; and a displaying unit configured to display a screen that prompts the reset of the acquired setting item required for the reset.

Further features of the present invention will become apparent from the following description of exemplary embodiments (with reference to the attached drawings).

BRIEF DESCRIPTION OF THE DRAWINGS

FIGS. 4A to 4C are diagrams illustrating an example of actual configuration data.

FIGS. 7A and 7B are diagrams illustrating an exemplary model-specific set value schema.

FIG. 11A is a diagram illustrating an example of meta-information

FIG. 11B shows an example of a definition table of handover condition included in meta-information.

FIG. 12 is a flowchart describing exemplary handover processing of configuration data when the image forming apparatus is replaced.

FIG. 17 is a diagram describing an example of an import of actual configuration data

DESCRIPTION OF THE EMBODIMENTS

Hereinafter, a description will be given of the information processing system of the present embodiment. Firstly, the terms used in the present embodiment are defined. The term "configuration data" refers to data (operation setting information) for switching the operation of an image forming apparatus. For example, configuration data corresponds to a default value for imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating the configuration of a device provided in an image forming apparatus. For example, device configuration data indicates whether or not an image forming apparatus includes a facsimile unit. Examples of device configuration data include a model code for uniquely identifying the model of an image forming apparatus, a running firmware version, and the like.

The term "model-specific set value schema" refers to data for defining the schema of configuration data that is held by a specific model of an image forming apparatus. The term "schema" refers to data for defining the convention and positioning for configuration data. Examples of such a model-specific set value schema include a condition(s) for validating the set value identifier for each configuration data, the default value, the value range, and data. In the present embodiment, it is assumed that there is a difference between configuration data to be held depending on the model of an image forming apparatus and a set value schema is prepared for different models of an image forming apparatus.

Figure 1:
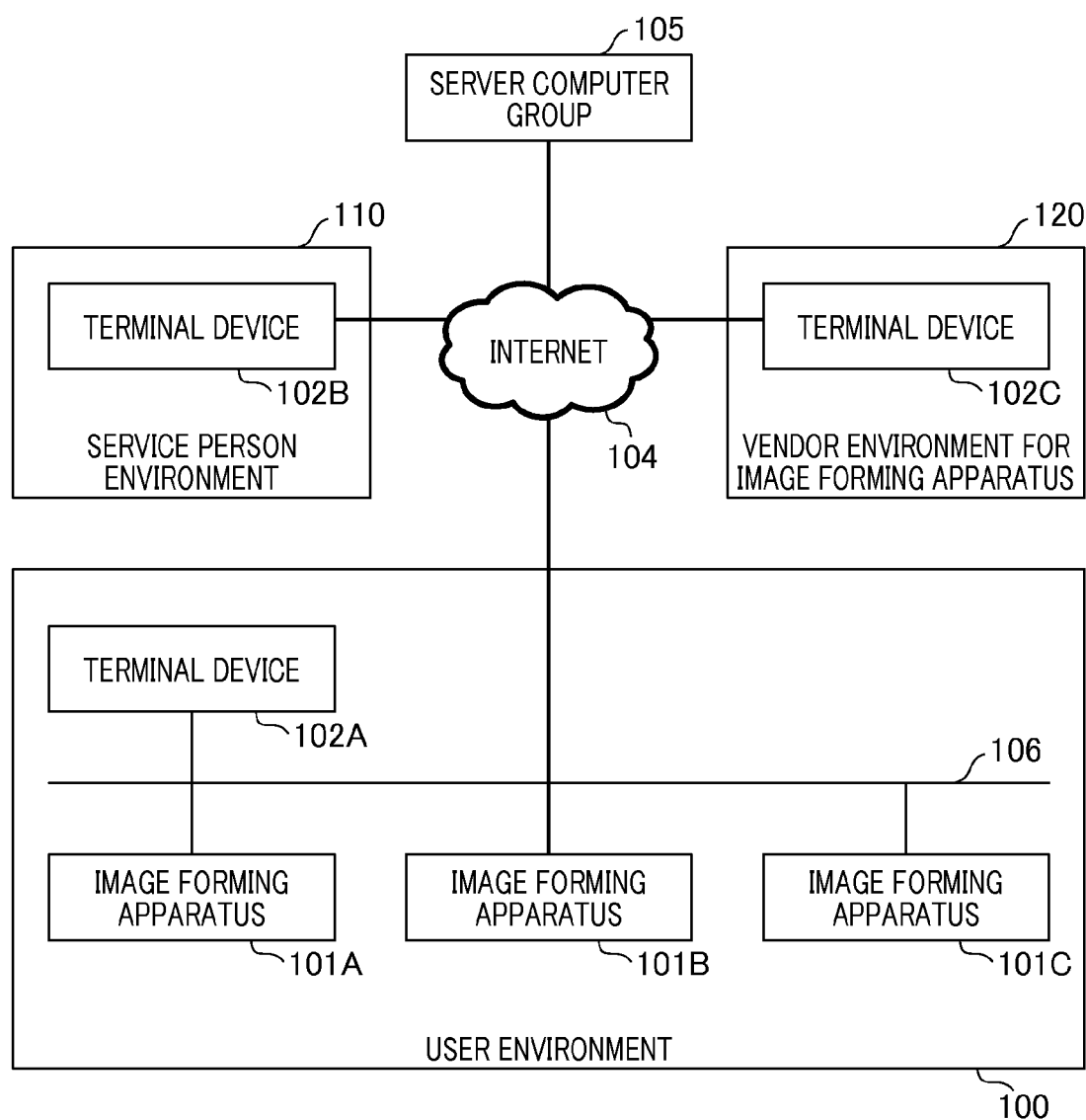
FIG. 1 is a diagram illustrating an exemplary general configuration of the present embodiment.

The term "virtual device" refers to a data group of actual devices held by a server computer group. More specifically, a virtual device includes at least device configuration data and configuration data. The term "tenant" refers to a unit of consignor to whom a user consigns the management of an image forming apparatus. In other words, a tenant is a management range of a user. The term "tenant identifier" refers to an identifier for uniquely identifying a tenant. For example, assume the case where management of image forming apparatuses 101A, 101B, and 101C in a user environment 100 (to be described below) shown in FIG. 1 is consigned by a certain company. In this case, a corresponding tenant identifier is assigned to the user environment 100 and the image forming apparatuses 101A, 101B, and 101C are recognized and managed as the image forming apparatuses belonging to the tenant.

The definition is given as follows so as to distinguish among data included in a virtual device, data held by an actual device, and data dedicated for a tenant. Device configuration data included in a virtual device is referred to as "virtual device configuration data" and configuration data included in a virtual device is referred to as "virtual configuration data". Device configuration data held by an actual device is referred to as "actual device configuration data" and configuration data held by an actual device is referred to as "actual configuration data". Also, configuration data that is commonly used by image forming apparatuses in a tenant is referred to as "tenant configuration data".

FIG. 1 is a diagram illustrating an exemplary general configuration of the present embodiment. The information processing system shown in FIG. 1 includes a user environment 100, a server computer group 105, a service person environment 110, and a vendor environment 120 for image forming apparatuses. The user environment 100, the server computer group 105, the service person environment 110, and the vendor environment 120 for image forming apparatuses communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. A network 106 is a network that is capable of providing digital communication in the user environment 100. The image forming apparatuses 101A, 101B, and 101C can access the Internet 104 via the network 106. The terminal apparatus 102A is a computer that is operable by a user of the user environment 100. The terminal apparatus 102A can also access the Internet 104 via the network 106.

The service person environment 110 is an environment where a service person manages an image forming apparatus using the terminal apparatus 102B. The service person environment 110 includes a terminal apparatus 102B. The terminal apparatus 102B is a computer that is operated by a service person who manages the image forming apparatuses 101A, 101B, and 101C. The terminal apparatus 102B can access the Internet 104.

The vendor environment 120 for image forming apparatuses is an environment where management personnel of a vendor for producing an image forming apparatus perform the maintenance of data which is required for the management of an image forming apparatus. The vendor environment 120 for image forming apparatuses includes a terminal apparatus 102C. The terminal apparatus 102C is a computer that is operated by management personnel of a vendor for producing an image forming apparatus. The terminal apparatus 102C can access the Internet 104.

The server computer group 105 is a server group that provides a set value management service 310 (see FIG. 3) for managing configuration data for image forming apparatuses. The server computer group 105 provides a service to a plurality of tenants via the Internet 104. In the present embodiment, the set value management service 310 provided by the server computer group 105 functions as a management apparatus that manages configuration data for image forming apparatuses. The set value management service 310 manages image forming apparatuses by associating them with tenants that are a preset management range. In other words, the set value management service 310 manages the image forming apparatuses for each management range. In the following description, the image forming apparatuses 101A, 101B, and 101C are also described as the image forming apparatus 101 and the terminal apparatuses 102B and 102C are also described as the terminal apparatus 102.

Figure 2:
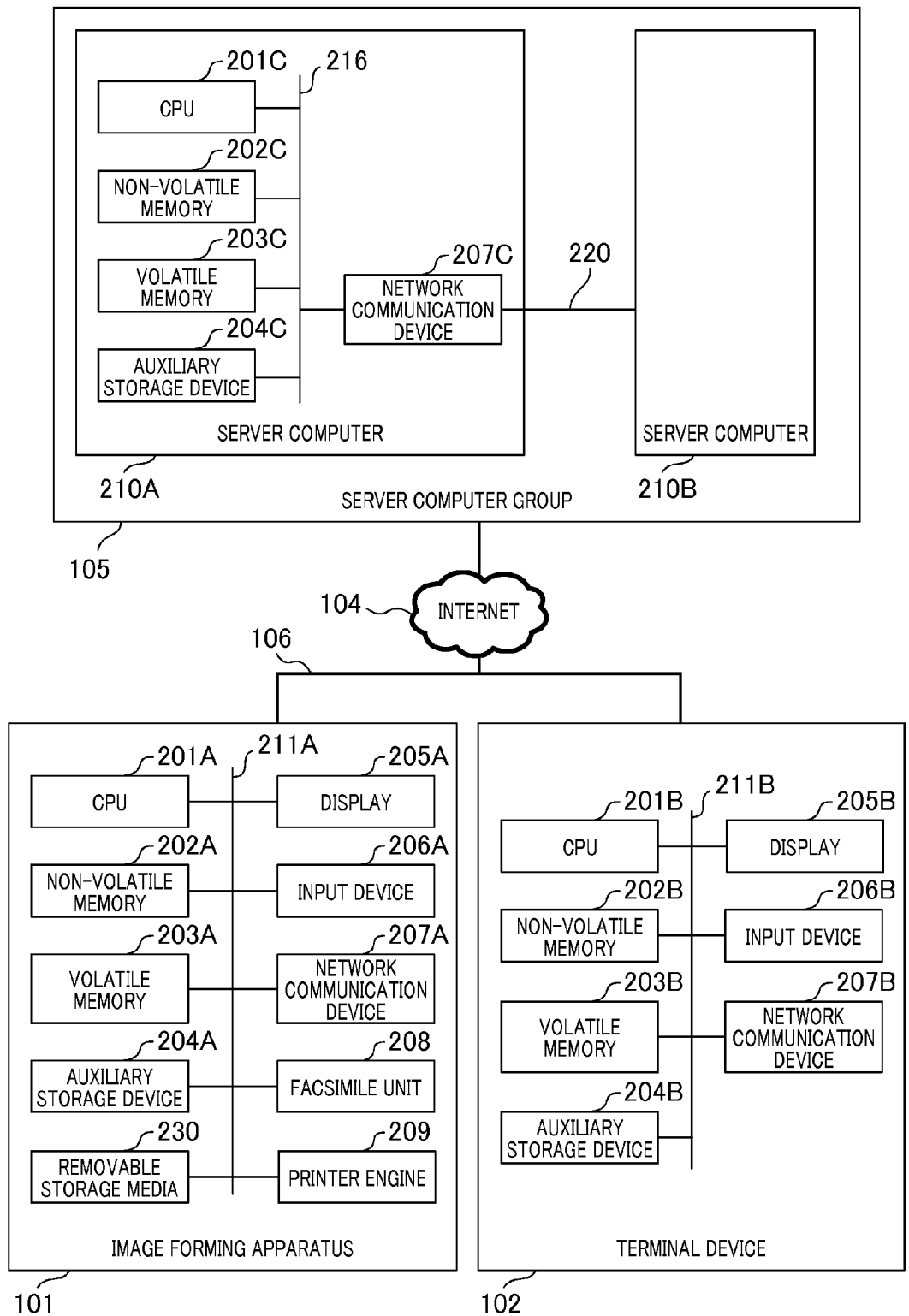
FIG. 2 is a diagram illustrating an example of the hardware configuration of an information processing system.

FIG. 2 is a diagram illustrating an example of the hardware configuration of the information processing system of the present embodiment. The server computer group 105 includes a server computer 210A and a server computer 210B. The server computer 210B has the same configuration as that of the server computer 210A. The server computer 210A and the server computer 210B communicate with each other via a network 220.

The server computer 210A includes a CPU 201C, a non-volatile memory 202C, a volatile memory 203C, an auxiliary storage device 204C, and a network communication device 207C that are connected to an internal bus 216. The image forming apparatus 101 includes a CPU 201A, a non-volatile memory 202A, a volatile memory 203A, an auxiliary storage device 204A, a display 205A, an input device 206A, a network communication device 207A, a facsimile unit 208, and a printer engine 209 that are connected to an internal bus 211A. The terminal apparatus 102 includes a CPU 201B, a non-volatile memory 202B, a volatile memory 203B, an auxiliary storage device 204B, a display 205B, an input device 206B, and a network communication device 207B that are connected to an internal bus 211B.

In the following description, the CPU 201A, 201B, and 201C are also described as a CPU 201, the non-volatile memories 202A, 202B, and 202C are also described as a non-volatile memory 202, the volatile memories 203A, 203B, and 203C are also described as a volatile memory 203, the auxiliary storage devices 204A, 204B, and 204C are also described as an auxiliary storage device 204, the displays 205A and 205B are also described as a display 205, the input devices 206A and 206B are also described as an input device 206, the network communication devices 207A and 207B are also described as a network communication device 207, and the internal buses 211A and 211B are also described as an internal bus 211.

The CPU (Central Processing Unit) 201 executes programs and controls various types of processing. The non-volatile memory 202 includes a ROM (Read Only Memory). The non-volatile memory 202 stores programs and data that is required for device start processing at the initial stage. The volatile memory 203 includes a RAM (Random Access Memory). The volatile memory 203 is used as a temporary storage location of the programs and data.

The auxiliary storage device 204 is a large-capacity storage device such as a hard disk, a RAM drive, or the like. The auxiliary storage device 204 stores large-capacity data and holds the execution code of the programs. The auxiliary storage device 204 stores data which needs to be held for a longer time than that of the volatile memory 203. The display 205 performs information display processing and notifies a user person of the resulting information. In the present embodiment, a user person denotes a user and a service person.

The input device 206 accepts a user person's selection instruction and transmits the instruction to a program via the internal bus 211. The network communication device 207 is a device that communicates with an external device via a network. The facsimile unit 208 is a hardware unit that transmits the image data formed by the image forming apparatus 101 or the image data stored in the auxiliary storage device 204A to an external device via the network 106. The facsimile unit 208 is optional and the image forming apparatus 101 may not include the facsimile unit 208. The printer engine 209 prints the image data formed by the image forming apparatus 101 or the image data stored in the auxiliary storage device 204A on a recording medium such as paper.

Figure 3:
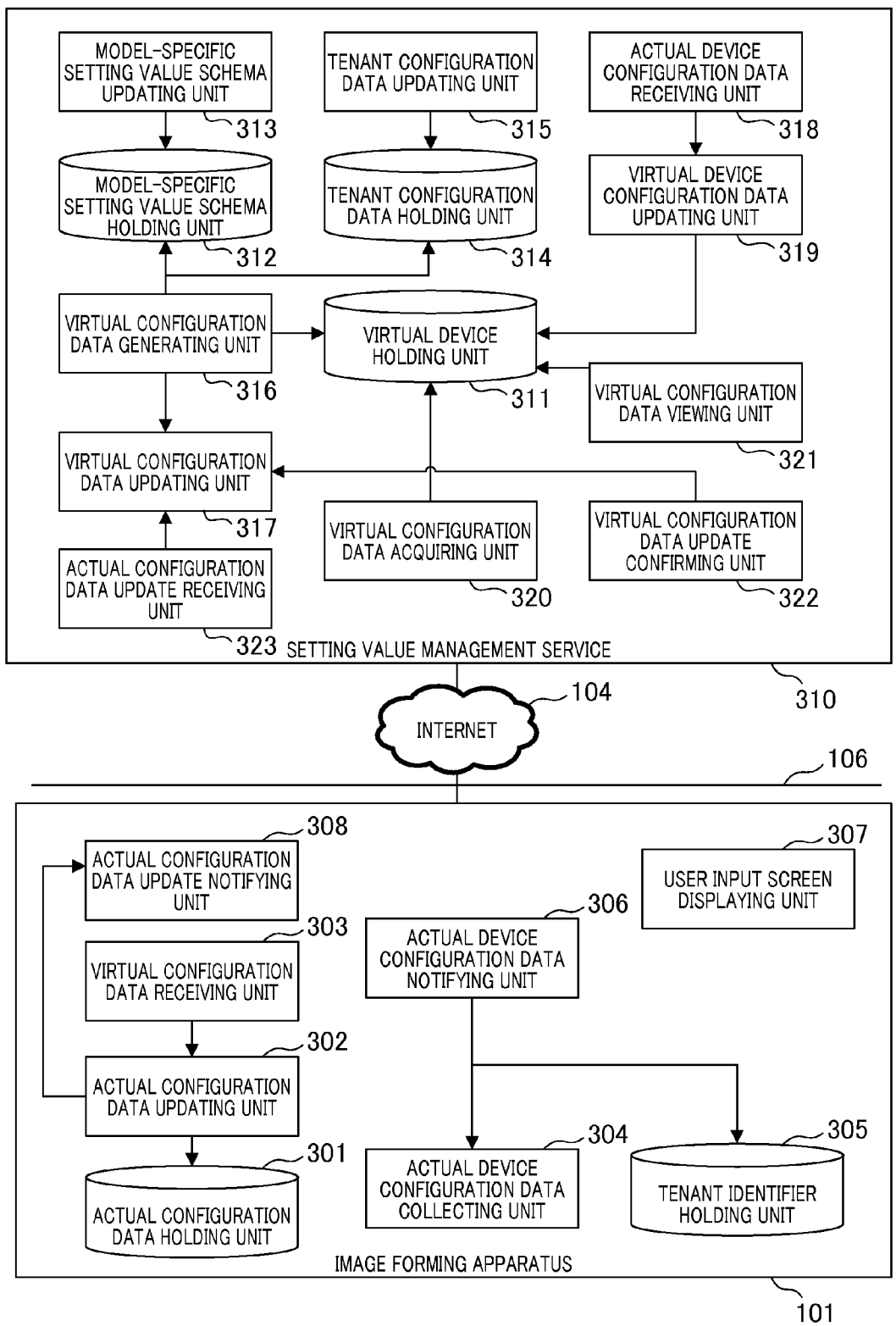
FIG. 3 is an exemplary functional block diagram of the information processing system.

FIG. 3 is an exemplary functional block diagram illustrating the information processing system of the present embodiment. The information processing system shown in FIG. 3 includes an image forming apparatus 101 and a set value management service 310. The image forming apparatus 101 and the set value management service 310 communicate with each other via the Internet 104. The management method of the present embodiment is realized by the functions provided in the information processing system shown in FIG. 3.

The image forming apparatus 101 includes an actual configuration data holding unit 301, an actual configuration data updating unit 302, a virtual configuration data receiving unit 303, an actual device configuration data collecting unit 304, and a tenant identifier holding unit 305. Also, the image forming apparatus 101 includes a user input screen displaying unit 307, and an actual configuration update notifying unit 308.

The actual configuration data holding unit 301 holds configuration data for an image forming apparatus. More specifically, the actual configuration data holding unit 301 stores configuration data in the auxiliary storage device 204A for management. The image forming apparatus switches an operational behavior based on actual configuration data held by the actual configuration data holding unit 301.

The actual configuration data updating unit 302 updates actual configuration data held by the actual configuration data holding unit 301. More specifically, the actual configuration data updating unit 302 updates actual configuration data by replacing it with virtual configuration data acquired by the virtual configuration data receiving unit 303. The actual configuration data is applied to the image forming apparatus 101. In other words, the actual configuration data updating unit 302 functions as an applying unit that applies the virtual configuration data acquired by the virtual configuration data receiving unit 303 to the image forming apparatus 101.

The virtual configuration data receiving unit 303 acquires virtual configuration data from the virtual configuration data acquiring unit 320 provided in the set value management service 310. The virtual configuration data receiving unit 303 calls the virtual configuration data acquiring unit 320 using an address which is set in the actual configuration data held by the actual configuration data holding unit 301.

FIGS. 4A to 4C are diagrams illustrating an example of actual configuration data. FIG. 4A shows actual configuration data for an image forming apparatus of which the device identifier is "010001". FIG. 4B shows actual configuration data for an image forming apparatus of which the device identifier is "010002". FIG. 4C shows actual configuration data for an image forming apparatus of which the device identifier is "020001". The device identifier is identification information for uniquely identifying an image forming apparatus.

Actual configuration data has data items including a set value identifier 702 and a value 703. The set value identifier 702 is an identifier for uniquely identifying a setting item. The value 703 is a value of a setting item. In the example shown in FIG. 4, http://ddd.com/config is set as the value (address) of "device_settings.cloud_address". The address is an address for a set value management service which is set as the set value management service for distributing configuration data to the image forming apparatus 101. Thus, the virtual configuration data receiving unit 303 described above accesses the address.

Note that virtual configuration data has the same data configuration as that of actual configuration data shown in FIG. 4.

Thus, a description will be given of the actual configuration data shown in FIG. 4 as virtual configuration data as appropriate.

Referring back to FIG. 3, the actual device configuration data collecting unit 304 collects device configuration data (actual device configuration data) of the image forming apparatus 101.

Figure 5A:
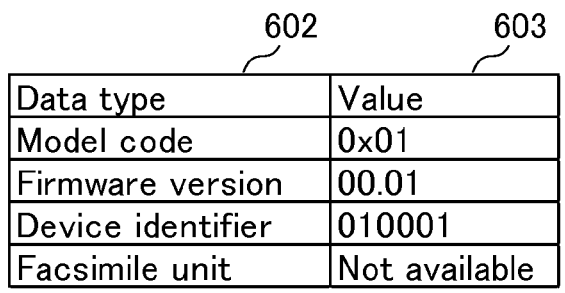
FIGS. 5A to 5C are diagrams illustrating an example of actual device configuration data.
Figure 5B:
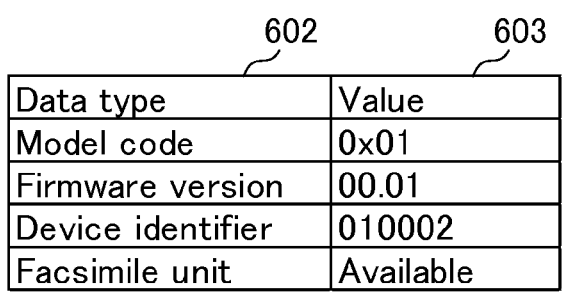
Figure 5C:
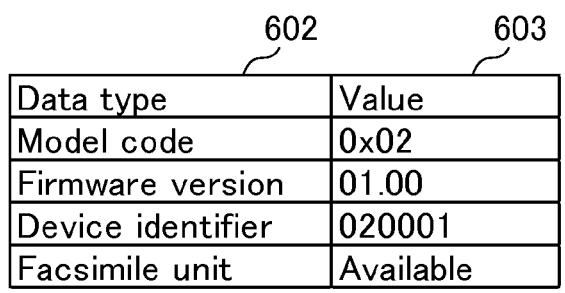

FIGS. 5A to 5C are diagrams illustrating an example of actual device configuration data. Each of FIGS. 5A, 5B, and 5C shows actual device configuration data for a different image forming apparatus. Actual device configuration data has data items including a data type 602 and a value 603. The data type 602 is the type of data included in actual device configuration data. A model code for identifying the model of an image forming apparatus, a firmware version, a device identifier for identifying a device, and the like are set to the data type 602. The value 603 is the value of data. A value (e.g., the value of a device identifier, the presence/absence of a facsimile unit, or the like) corresponding to the data type is set to the value 603. Note that virtual device configuration data has the same data configuration as that of actual device configuration data. Thus, a description will be given of the actual configuration data shown in FIG. 5 as virtual configuration data as appropriate.

Referring back to FIG. 3, the tenant identifier holding unit 305 holds a tenant identifier that is the identifier of a tenant to which the image forming apparatus 101 belongs. The tenant identifier is set upon initial installation of the image forming apparatus 101 and is stored in the auxiliary storage device 204A so as not to be lost even when the power is OFF.

The actual device configuration data notifying unit 306 notifies the actual device configuration data receiving unit 318 of the set value management service 310 of the actual device configuration data collected by the actual device configuration data collecting unit 304 and the tenant identifier held by the tenant identifier holding unit 305. More specifically, the actual device configuration data notifying unit 306 transmits a configuration data generation request including the actual device configuration data and the tenant identifier to the actual device configuration data receiving unit 318. The configuration data generation request is a request (operation setting generation request) for generating virtual configuration data corresponding to the image forming apparatus 101.

The user input screen displaying unit 307 displays a screen on the display 205 and the like on which a user confirms a setting employed by the user (a setting confirmation screen) or a screen for changing the setting employed by the user (a setting change screen).

When the user changes the setting on the setting change screen, the user input screen displaying unit 307 requests the actual configuration data updating unit 302 to reflect the setting changed content on actual configuration data. The actual configuration data updating unit 302 that has replied to this request updates actual configuration data hold in an actual configuration data holding unit 301. Then the actual configuration data updating unit 302 instructs an actual configuration data update notifying unit 308 to notify the set value management service 310 of the updated content of actual configuration data.

As will hereinafter be described, meta-information shown in FIG. 11A is associated with configuration data. For example, when the user changes a setting value corresponding to a certain setting item of configuration data from an initial value, the actual configuration data updating unit 302 sets a change flag included in meta-information associated with this configuration data. Specifically, "0" set in the change flag is changed to be "1".

The set value management service 310 includes a virtual device holding unit 311, a model-specific set value schema holding unit 312, a model-specific set value schema updating unit 313, a tenant configuration data holding unit 314, and a tenant configuration data updating unit 315. The set value management service 310 also includes a virtual configuration data generating unit 316, the virtual configuration data updating unit 317, an actual device configuration data receiving unit 318, and a virtual device configuration data updating unit 319. The set value management service 310 also includes a virtual configuration data acquiring unit 320, a virtual configuration data viewing unit 321, a virtual configuration data update confirming unit 322, and an actual configuration data update receiving unit 323.

The virtual device holding unit 311 holds a virtual device. The virtual device includes at least virtual device configuration data and virtual configuration data. The virtual device holding unit 311 stores and manages virtual device in the auxiliary storage device 204C.

Figure 6:
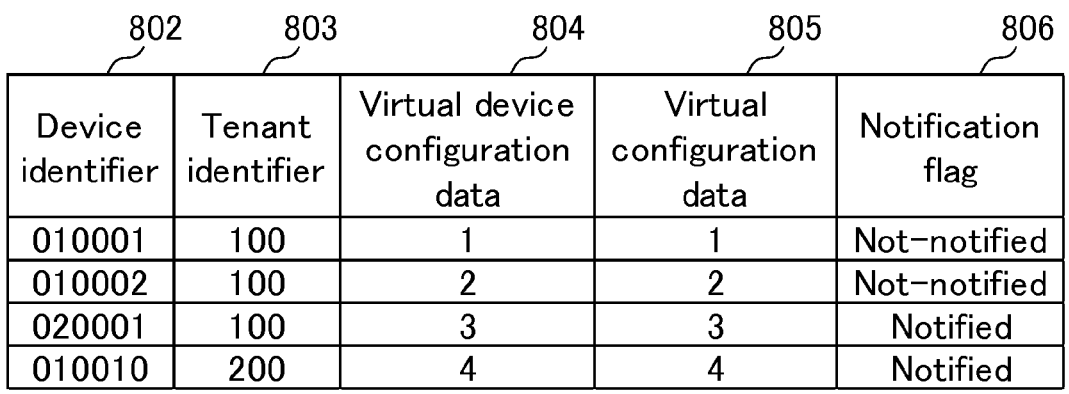
FIG. 6 is a diagram illustrating an exemplary virtual device.

FIG. 6 is a diagram illustrating an example of a virtual device. The virtual device shown in FIG. 6 includes a device identifier 802, a tenant identifier 803, virtual device configuration data 804, virtual configuration data 805, and a notification flag 806.

The device identifier 802 is identification information that uniquely identifies the virtual device. The device identifier 802 is equivalent to identification information that uniquely identifies the image forming apparatus 101 corresponding to the virtual device. The device identifier 802 is included in device configuration data of which the image forming apparatus 101 notifies to the set value management service 310. The tenant identifier 803 is identification information that uniquely identifies a tenant to which the image forming apparatus 101 corresponding to the virtual device belongs.

The virtual device configuration data 804 is identification information that uniquely identifies virtual device configuration data. Virtual device configuration data corresponds to device configuration data (actual device configuration data) of the image forming apparatus 101 corresponding to virtual device. Virtual configuration data 805 is identification information that uniquely identifies virtual configuration data. Virtual configuration data corresponds to configuration data (actual configuration data) of the image forming apparatus 101 corresponding to the virtual device.

The notification flag 806 indicates that virtual configuration data 805 has been notified or not been notified to the image forming apparatus. The flag "not-notified" set in the notification flag 806 indicates that the image forming apparatus has not been notified about the virtual configuration data 805. The flag "notified" set in the notification flag 806 indicates that the image forming apparatus has already been notified about the virtual configuration data 805.

Referring back to FIG. 3, the model-specific set value schema holding unit 312 holds the model-specific set value schema. One model-specific set value schema is prepared corresponding to each model of image forming apparatuses.

FIGS. 7A and 7B are diagrams illustrating an exemplary model-specific set value schema. FIG. 7A shows a model-specific set value schema corresponding to the model code of 0x01. FIG. 7B shows a model-specific set value schema corresponding to the model code of 0x02. The model-specific set value schema has data items including a set value identifier 402, a default value 403, a value range 404, and a condition 405.

The set value identifier 402 is identification information for uniquely identifying a setting item. For example, the set value identifier "copy_settings.nup" indicates a setting item relating to imposition in copy settings. If the set value identifiers 402 are identical, it indicates the fact that the setting items are identical in spite of different models. The default value 403 is a default set value for the model. The value range 404 is a definition of a range which can be set in the model. For example, the value range 404 of the set value identifier "copy_settings.nup" indicates that the value range can be selected from three types of copy settings "1 in 1, 2 in 1, and 4 in 1" in the model.

The condition 405 is a definition of the conditions necessary for using set values in the model. The condition "facsimile unit" is set in the condition 405 corresponding to the setting item of "fax_settings.received_print". Thus, the set value for the setting item becomes valid only when mounting of a facsimile unit is confirmed.

Referring back to FIG. 3, the model-specific set value schema updating unit 313 updates the model-specific set value schema held by the model-specific set value schema holding unit 312. For example, when a vendor of the image forming apparatus releases a new model, a model-specific set value schema corresponding to the new model is registered in accordance with the instruction given by the administrator of the vendor. If any setting item is changed, the model-specific set value schema updating unit 313 updates the model-specific set value schema. The tenant configuration data holding unit 314 holds configuration data that a tenant would like to set to an image forming apparatus.

Figure 8:
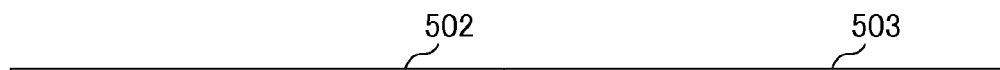
FIG. 8 is a diagram illustrating an example of tenant configuration data.

FIG. 8 is a diagram illustrating an example of tenant configuration data. Tenant configuration data has data items including a set value identifier 502 and a value 503. The set value identifier 502 is the same as the set value identifier 402 included in the model-specific set value schema shown in FIGS. 7A and 7B. The value 503 is a common setting value desired by a tenant. The copy setting "2 in 1" is set in the set value identifier "copy_settings.nup". This indicates that the user desires that the copy setting "2 in 1" be set in all image forming apparatuses held by a tenant.

Referring back to FIG. 3, the tenant configuration data updating unit 315 updates tenant configuration data held by the tenant configuration data holding unit 314. In accordance with the operation by a service person who manages image forming apparatuses held by a tenant, the terminal apparatus 102B in the service person environment 110 provides an update instruction for tenant configuration data. The tenant configuration data updating unit 315 updates tenant configuration data in accordance with the update instruction. Note that the service person performs operation on a setting screen which is displayed on a web browser running on the terminal apparatus 102B.

The virtual configuration data generating unit 316 generates virtual configuration data based on the model-specific set value schema, tenant configuration data, and virtual device configuration data. Firstly, the virtual configuration data generating unit 316 acquires virtual device configuration data shown in FIG. 5A from the virtual device holding unit 311.

Next, the virtual configuration data generating unit 316 refers to a model code included in the acquired virtual device configuration data to thereby specify the model of the image forming apparatus. Using the virtual device configuration data shown in FIG. 5A as an example, 0x01 is set as a value corresponding to the model code. Thus, the virtual configuration data generating unit 316 specifies the model of the image forming apparatus having the model code of 0x01.

Next, the virtual configuration data generating unit 316 acquires a model-specific set value schema corresponding to the specified model code from the model-specific set value schema holding unit 312. The virtual configuration data generating unit 316 acquires, for example, the model-specific set value schema shown in FIG. 7A, of which the model code matches 0x01.

Next, the virtual configuration data generating unit 316 generates virtual configuration data based on the set values defined in the acquired model-specific set value schema. Using the model-specific set value schema shown in FIG. 7A as an example, the virtual configuration data generating unit 316 generates virtual configuration data based on set values corresponding to five setting items "copy_settings.nup", "device_settings.cloud_address", "device_settings.sleep_time", "fax_settings.received_print", and "box_settings.server_address".

Next, the virtual configuration data generating unit 316 acquires tenant configuration data shown in FIG. 8 from the tenant configuration data holding unit 314. The virtual configuration data generating unit 316 determines whether or not the set value included in tenant configuration data falls within the value range defined in the model-specific set value schema.

A description will be given by taking an example of tenant configuration data shown in FIG. 8 and model-specific set value schema shown in FIG. 7A. The value (set value) for the setting item "copy_settings.nup" included in tenant configuration data is "2 in 1". On the other hand, the value range corresponding to the setting item, which is defined in the model-specific set value schema, is "1 in 1, 2 in 1, and 4 in 1". Thus, the set value included in tenant configuration data falls within the value range defined in the model-specific set value schema.

The value (set value) for the setting item "device_settings.sleep_time" included in tenant configuration data is "10 seconds". On the other hand, the value range corresponding to the setting item, which is defined in the model-specific set value schema, is "1 minute, 10 minutes, and 1 hour". Thus, the set value included in tenant configuration data does not fall within the value range defined in the model-specific set value schema. When the set value included in tenant configuration data does not fall within the value range defined in the model-specific set value schema, the virtual configuration data generating unit 316 acquires the default value defined in the model-specific set value schema. In this example, the default value "10 minutes" is acquired. The virtual configuration data generating unit 316 uses the acquired default value as the set value for the setting item in virtual configuration data.

When the set value included in tenant configuration data falls within the value range defined in the model-specific set value schema, the virtual configuration data generating unit 316 takes the set value included in tenant configuration data as the set value corresponding to the setting item of virtual configuration data.

Next, the virtual configuration data generating unit 316 determines whether or not virtual device configuration data satisfies the condition defined in the model-specific set value schema. Referring to the model-specific set value schema shown in FIG. 7A, there is no particular condition corresponding to "copy_settings.nup". Thus, virtual device configuration data shown in FIG. 5A satisfies the condition corresponding to "copy_settings.nup".

However, the condition corresponding to "fax_settings.received_print" is "facsimile unit", whereas the value "none" is set as a value for "facsimile unit" included in virtual device configuration data. Thus, virtual device configuration data does not satisfy the condition corresponding to the setting item.

When virtual device configuration data does not satisfy the condition defined in the model-specific set value schema, the virtual configuration data generating unit 316 acquires the default value 403 defined in the model-specific set value schema. In this example, the virtual configuration data generating unit 316 acquires a default value "OFF" corresponding to "fax_settings.received_print". The virtual configuration data generating unit 316 uses the acquired default value as the set value for the setting item in virtual configuration data.

Referring back to FIG. 3, the virtual configuration data updating unit 317 updates virtual configuration data in the virtual device held by the virtual device holding unit 311 with virtual configuration data generated by the virtual configuration data generating unit 316.

More specifically, among the virtual devices held by the virtual device holding unit 311, the virtual configuration data updating unit 317 acquires a virtual device having a device identifier corresponding to the generated virtual configuration data. When the notification flag 806 is set in "notified", the virtual configuration data updating unit 317 that has updated virtual configuration data sets the notification flag 806 to "not-notified". The notification flag 806 "not-notified" means that virtual configuration data corresponding to the image forming apparatus has been changed and thus the image forming apparatus needs to refer to new virtual configuration data.

Also, virtual configuration data updating unit 317 acquires the updated content of actual configuration data of the image forming apparatus 101 from the actual configuration data update notification receiving unit 323. Then, the virtual configuration data updating unit 317 reflects the acquired updated content on virtual configuration data. For example, it is assumed that the actual configuration data update receiving unit 323 is notified from the actual configuration data update notifying unit 308 of the image forming apparatus 101 that the change flag included in meta-information associated with actual configuration data has been set.

In this case, actual configuration data update receiving unit 323 notifies the virtual configuration data updating unit 317 that the change flag has been set. The virtual configuration data updating unit 317 acquires meta-information associated with virtual configuration data included in virtual device held by the virtual device holding unit 311. Then, the virtual configuration data updating unit 317 sets the change flag included in the acquired meta-information. In this manner, the virtual device is updated. Note that the change flag included in the meta-information associated with actual configuration data corresponding to the image forming apparatus 101 has been already set in this case. Thus, the virtual configuration data updating unit 317 retains the notification flag of the virtual device as "notified" in this case.

The actual device configuration data receiving unit 318 receives device configuration data (FIGS. 5A to 5C) and the tenant identifier from the actual device configuration data notification unit 306 provided in the image forming apparatus 101. The virtual device configuration data updating unit 319 updates virtual device configuration data held by the virtual device that is held by the virtual device holding unit 311 with device configuration data received by the actual device configuration data receiving unit 318.

More specifically, among the virtual devices held by the virtual device holding unit 311, the virtual device configuration data updating unit 319 acquires the virtual device having the device identifier set in device configuration data that has been received by the actual device configuration data receiving unit 318. Then, the virtual device configuration data updating unit 319 updates virtual device configuration data held by the acquired virtual device with device configuration data that has been received by the actual device configuration data receiving unit 318 and stores virtual device configuration data in the virtual device holding unit 311 that is a storage unit. In other words, the actual device configuration data receiving unit 318 and the virtual device configuration data updating unit 319 functions as configuration information acquiring unit that acquires from the image forming apparatus device configuration information retained by the image forming apparatus via the network and stores configuration information in the storage unit.

The virtual configuration data acquiring unit 320 receives a virtual configuration data acquisition request from the virtual configuration data receiving unit 303 provided in the image forming apparatus 101 via the Internet 104 to thereby acquire virtual configuration data from the virtual device holding unit 311.

The virtual configuration data acquisition request includes at least a device identifier for specifying a virtual device. Thus, the virtual configuration data acquiring unit 320 searches for a virtual device having a device identifier included in the virtual configuration data acquisition request. The virtual configuration data acquiring unit 320 acquires virtual configuration data in the searched virtual device. The virtual configuration data acquiring unit 320 functions as a transmitting unit that passes the acquired virtual configuration data to the request source, i.e., the virtual configuration data receiving unit 303 via the Internet 104.

The virtual configuration data viewing unit 321 receives a configuration data viewing request from an external device via the Internet 104. The configuration data viewing request is a request on/using an HTTP protocol. The virtual configuration data viewing unit 321 acquires virtual configuration data corresponding to the viewing request and generates a HTML page for viewing for the acquired virtual configuration data to return the HTML page for viewing to the request source.

The virtual configuration data update confirming unit 322 confirms whether or not virtual configuration data has been updated. More specifically, the virtual configuration data receiving unit 303 provided in the image forming apparatus 101 transmits the device identifier of the image forming apparatus 101 to the virtual configuration data update confirming unit 322 via the Internet 104. The virtual configuration data update confirming unit 322 searches a virtual device having the received device identifier from the virtual devices held by the virtual device holding unit 311. The virtual configuration data update confirming unit 322 refers to the notification flag 806 for the searched virtual device.

When the notification flag 806 is "not-notified", the virtual configuration data update confirming unit 322 determines that virtual configuration data has been updated. When the notification flag 806 is "notified", the virtual configuration data update confirming unit 322 determines that virtual configuration data has not been updated. The virtual configuration data update confirming unit 322 returns the update status of the virtual configuration data to the virtual configuration data receiving unit 303. Then, the virtual configuration data receiving unit 303 that has confirmed the update of virtual configuration data makes a configuration data acquisition request to the virtual configuration data acquiring unit 320 of the set value management service 310.

The virtual configuration data update confirming unit 322 may also confirm whether or not virtual configuration data has been updated based on the fact as a trigger that virtual configuration data has been updated by the virtual configuration data updating unit 317. Then, when the virtual configuration data update confirming unit 322 confirms that virtual configuration data has been updated, the virtual configuration data acquiring unit 320 may also acquire configuration data and transmit it to the virtual configuration data receiving unit 303 of the image forming apparatus 101.

Firstly, the tenant configuration data updating unit 315 detects a tenant configuration data update request transmitted from the terminal apparatus 102A (step S901). Next, the tenant configuration data updating unit 315 confirms whether or not tenant configuration data corresponding to the tenant configuration data update request has already been registered to the tenant configuration data holding unit 314 (step S902). When tenant configuration data corresponding to the tenant configuration data update request has already been registered, the process advances to step S907. When tenant configuration data corresponding to the tenant configuration data update request has not yet been registered, the process advances to step S903.

In step S903, the tenant configuration data updating unit 315 acquires a virtual device held by a tenant from the virtual device holding unit 311. The tenant configuration data updating unit 315 acquires virtual device configuration data included in the acquired virtual device. Then, the tenant configuration data updating unit 315 acquires a model code included in the acquired virtual device configuration data (step S903).

Next, the tenant configuration data updating unit 315 acquires model-specific set value schemas corresponding to the acquired model code from the model-specific set value schema holding unit 312 (step S904). Next, the tenant configuration data updating unit 315 lists the setting items included in at least one of the model-specific set value schemas acquired in step S904 (step S905). Then, the tenant configuration data updating unit 315 generates blank tenant configuration data having the setting items listed up in step S905 (step S906), and the process advances to step S907.

In step S907, the tenant configuration data updating unit 315 detects a specific update instruction for tenant configuration data (step S907). Then, the tenant configuration data updating unit 315 updates tenant configuration data based on the update instruction detected in step S907 (step S908). The tenant configuration data holding unit 314 stores the updated tenant configuration data.

Next, the virtual configuration data generating unit 316 detects that tenant configuration data has been updated (step S909). Then, the virtual configuration data generating unit 316 searches a virtual device, of which the tenant identifier matches the tenant identifier of tenant configuration data of which an update has been detected, from the virtual devices held by the virtual device holding unit 311. In order to perform processing for the searched virtual devices in sequence, the virtual configuration data generating unit 316 acquires one virtual device. The virtual configuration data generating unit 316 determines whether or not the virtual device is successively acquired (step S910). When processing for all virtual devices is performed in sequence and the next virtual device cannot be acquired, the process ends. When the virtual configuration data generating unit 316 successively acquires the next virtual device, the process advances to step S911.

In step S911, the virtual configuration data generating unit 316 acquires virtual device configuration data from a virtual device to be processed (step S911). Next, the virtual configuration data generating unit 316 acquires a model code from virtual device configuration data acquired in step S911. Then, the virtual configuration data generating unit 316 acquires a model-specific set value schema corresponding to the acquired model code from the model-specific set value schema holding unit 312 (step S912).

Next, the virtual configuration data generating unit 316 generates virtual configuration data based on the virtual device configuration data, model-specific set value schema, and tenant configuration data (step S913). Then, the virtual configuration data updating unit 317 registers the generated virtual configuration data in the virtual device (step S914), and the process returns to step S910. Through the process in step S914, the updated tenant configuration data is reflected in the virtual device.

Figure 10:
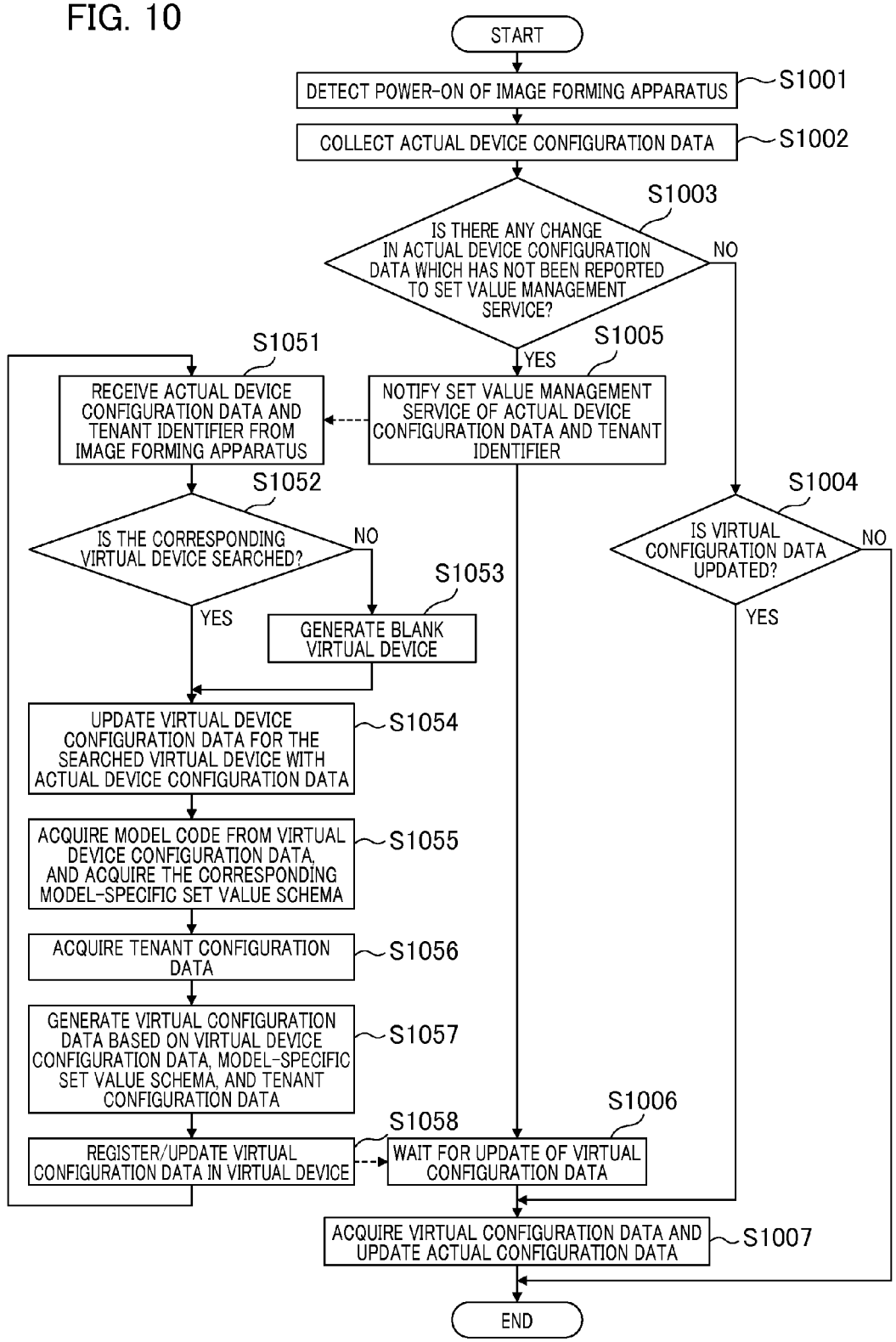
FIG. 10 is an example of a flowchart describing processing in which the image forming apparatus acquires virtual configuration data.

FIG. 10 is an example of a flowchart describing processing that the image forming apparatus acquires virtual configuration data. Steps S1001 to S1007 are performed by the image forming apparatus. A program that performs these step is stored in any one storage unit among the non-volatile memory 202A, the volatile memories 203A, or the auxiliary storage device 204A, and executed by the CPU 201A. Also, Steps S1051 to S1058 are executed by the server computer group 105. A program that performs these steps is stored in any one storage unit among the non-volatile memory 202C, the volatile memory 203C, or the auxiliary storage device 204C, and execute by the CPU 201.

Firstly, the actual device configuration data notifying unit 306 of the image forming apparatus 101 detects the power-ON of the image forming apparatus 101 (step S1001). Next, the actual device configuration data collecting unit 304 collects device configuration data (step S1002).

Next, the actual device configuration data notifying unit 306 functions as a configuration change determining unit that determines whether there is any change in configuration information about the devices provided in the image forming apparatus 101. More specifically, the actual device configuration data notifying unit 306 determines whether there is any change in actual device configuration data, which has not been reported to the set value management service 310, based on actual device configuration data collected in step S1002 (step S1003).

If there is any change in actual device configuration data which has not been reported, the process advances to step S1005. If there is no change in actual device configuration data which has not been reported, the process advances to step S1004. When a new device is installed, the process advances to step S1005.

In step S1004, the virtual configuration data receiving unit 303 determines whether or not the device has already acquired the latest virtual configuration data, that is, the virtual configuration data has already been updated (step S1004). More specifically, the virtual configuration data receiving unit 303 confirms with the virtual configuration data update confirming unit 322 of the set value management service 310 via the Internet 104 whether or not virtual configuration data has been updated. The virtual configuration data receiving unit 303 determines whether or not virtual configuration data has been updated based on the confirmation result. If virtual configuration data has not been updated, the process ends. If virtual configuration data has been updated, the process advances to step S1007.

In step S1005, the actual device configuration data notifying unit 306 notifies the set value management service 310 about a configuration data generation request including actual device configuration data and the tenant identifier (step S1005). The notification destination address is an address held by the actual configuration data holding unit 301.

In step S1051, the set value management service 310 detects the notification and then performs processing. A detailed description of processing executed by the set value management service 310 will be given below.

Next, the virtual configuration data receiving unit 303 waits for the execution of the processing until the update of virtual configuration data is completed (step S1006). Next, the virtual configuration data receiving unit 303 receives virtual configuration data from the set value management service 310. Then, the virtual configuration data updating unit 317 updates the received virtual configuration data as actual configuration data (step S1007). Actual configuration data is stored by the actual configuration data holding unit 301.

In step S1051, the actual device configuration data receiving unit 318 of the set value management service 310 accepts the configuration data generation request including actual device configuration data and the tenant identifier from the image forming apparatus 101 (step S1051).

Next, among the virtual devices held by the virtual device holding unit 311, the virtual device configuration data updating unit 319 searches for a virtual device that matches the actual device configuration data and the tenant identifier both included in the configuration data generation request received in S1051 (step S1054). If the matched virtual device has been found, the process advances to step S1054. If the matched virtual device has not been found, the process advances to step S1053. When an image forming apparatus communicates with the set value management service 310 for the first time upon installation of a new device, there may be cases where searching for a virtual device is not possible. Thus, in this case, the process advances to step S1053.

In step S1053, the virtual device configuration data updating unit 319 generates a blank virtual device (step S1053), and the process advances to step S1054. Next, the virtual device configuration data updating unit 319 updates virtual device configuration data for the virtual device searched in S1052 with actual device configuration data included in the configuration data generation request received in step S1051 (step S1054). Also, the virtual device configuration data updating unit 319 sets actual device configuration data included in the configuration data generation request received in step S1051 as virtual device configuration data for the virtual device generated in step S1053. With this arrangement, the virtual device corresponding to the image forming apparatus 101 is updated.

Next, the virtual configuration data generating unit 316 acquires a model code from virtual device configuration data updated in step S1056. Then, the virtual configuration data generating unit 316 acquires a model-specific set value schema corresponding to the acquired model code from the model-specific set value schema holding unit 312 (step S1055).

Next, the virtual configuration data generating unit 316 acquires tenant configuration data (step S1056). More specifically, the virtual configuration data generating unit 316 acquires tenant configuration data corresponding to the tenant identifier received in step S1051 from tenant configuration data held by the tenant configuration data holding unit 314.

Next, the virtual configuration data generating unit 316 generates virtual configuration data based on the virtual device configuration data, model-specific set value schema, and tenant configuration data (step S1057). The process in step S1057 is the same as that in step S913 shown in FIG. 9. In other words, the virtual configuration data generating unit 316 generates configuration data corresponding to the image forming apparatus 101 based on configuration information (device configuration data) included in the configuration data generation request.

Next, the virtual configuration data updating unit 317 updates the generated virtual configuration data by registering it in the virtual device in question (step S1058). In step S1058, the virtual configuration data acquiring unit 320 further transmits the generated virtual configuration data to the virtual configuration data receiving unit 303 of the image forming apparatus 101.

Next, the description will be given of processing configuration data is handed over upon replacement of the image forming apparatus. Firstly, the set value management service 310 backs up (store in the storage unit) information of virtual device configuration data and virtual configuration data corresponding to image forming apparatus before being replaced. Hereinafter, configuration data corresponding to the image forming apparatus before being replaced is also described as first operation setting information. Then, virtual configuration data in an initial state is generated in a similar manner to a sequence for registering a new image forming apparatus. Specifically, similar processing to processing described with reference to FIG. 9 and FIG. 10.

However, in processing performed upon handover of configuration data, processing in step S1057 and step S1007 shown in FIG. 10 are different from processing upon registration of the new image forming apparatus. Hereinafter, detailed description mainly of processing different from processing of registration of the new generation with respect to processing of virtual configuration data included in handover processing of configuration data of the image forming apparatus accompanied with replacement.

FIG. 11A and FIG. 11B are diagrams illustrating an example of meta-information associated with configuration data. FIG. 11A illustrates exemplary meta-information formation. The meta-information shown in FIG. 11A is associated with actual configuration data and virtual configuration data.

As shown in FIG. 11A, the meta-information includes data items such as a set value identifier 1101, an initial value 1102, an operational value 1103, a type 1104, a size 1105, handover condition 1106, change flag 1107, and the like.

The set value identifier 1101 is same as the set value identifier 402 included in configuration data shown in FIGS. 7A and 7B. The initial value 1102 is an initial value of the setting value. The operational value 1103 is a current value of the setting value. The type 1104 is a type of the setting value. The size 1105 is a size of the setting value. The handover condition 1106 is a condition relating to the handover of the operational value of the setting to the image forming apparatus after being replaced, that is, a condition whether or not the setting corresponding to the setting item is handed over to configuration data of the image forming apparatus after being replaced.

When the handover condition is satisfied, the operational value of the setting is handed over to the image forming apparatus after being replaced. For each setting item, processing following the handover condition is executed. The change flag 1107 functions as changing information indicating whether or not a user has changed the initial value to another value about the setting. When the change flag is set ("1" is set), it means that the user has changed the initial value to another value about the setting. While the change flag is not set ("0" is set), it means that the user has not changed the initial value to another value about the setting.

FIG. 11B illustrates a definition table about a handover conditions included in meta-information. The definition table of the handover condition includes data items such as a handover condition and a detail. The handover condition corresponds to the handover condition 1106 shown in FIG. 11A. The detail indicates processing corresponding to the handover condition. For example, "None" means that no handover is performed upon replacement. In other words, "None" functions as first instruction information that instructs that the setting item is required for resetting regardless of a changed content of device configuration information. "Force" means that the handover is certainly performed whatever replacement is occurred. In other words, "Force" functions as second instruction information that instructs that the setting of configuration data before being replaced is handed over to configuration data after being replaced regardless of the changed content of device configuration information.

"Tray_Bin" means that the setting is not handed over when the structure of a paper feeding and delivering stage is changed. "Color_Type" means that the setting is not handed over when a color/monochrome is changed due to the replacement. In other words, "Tray_Bin" and "Color_Type" function as third instruction information that instructs that the setting item is required for resetting when specific configuration information has been changed.

An example of the setting item that cannot be handed over accompanied with replacement is preferential discharge destination information in case that a structure of the discharging tray provided in the image forming apparatus having a plurality of discharge destinations. Also, when a reading capability of a scanner is changed, a default reading resolution setting cannot be handed over. Also, when a scan capability (a color/monochrome type) of the scanner is changed, a default setting for a file creation cannot be handed over. In other words, for example, the setting item of which the user has changed the setting item from the initial state for the purpose of usability or own preference and uses the image forming apparatus cannot be handed over.

For above reasons described with reference to FIGS. 11A and 11B, the handover condition and the change flag corresponding to the changed content of device configuration information accompanied with replacement of the image forming apparatus for each setting item is associated with configuration data.

Figure 9:
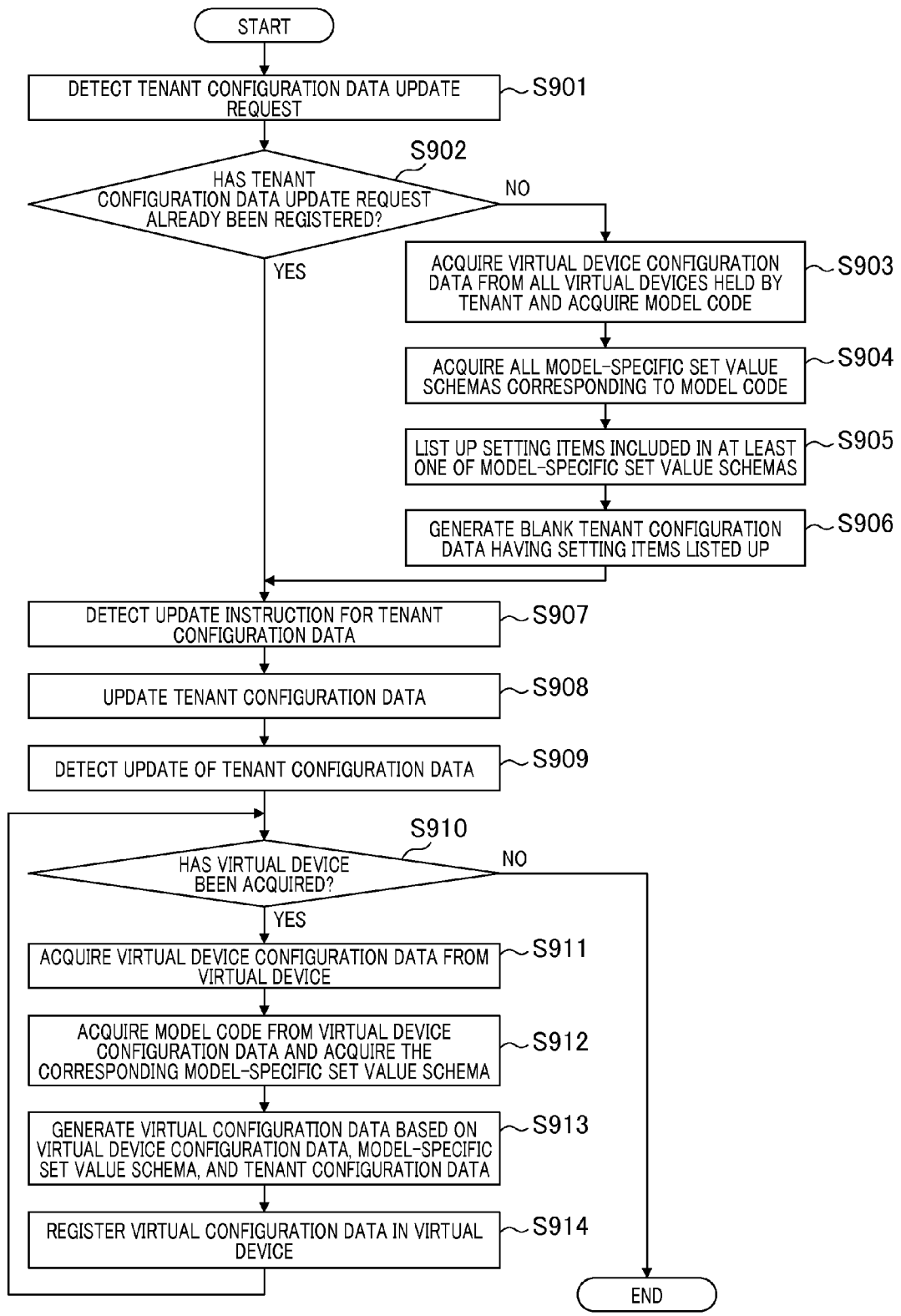
FIG. 9 is a diagram illustrating an example of a flowchart describing update processing of tenant configuration data.

FIG. 12 illustrates a flowchart describing an example of handover processing upon replacement of the image forming apparatus. Aforementioned processing in the flowchart shown in FIG. 9 and FIG. 10 is a process flow when a new image forming apparatus is located. When the image forming apparatus is replaced, the flowchart shown in FIG. 9 and FIG. 10 is generally executed, steps relating to handover processing of configuration data are additionally occurred.

Specifically, the set value management service 310 executes following processing of which step 1057 of FIG. 10 is developed. Firstly, the set value management service 310 generates virtual configuration data of an image forming apparatus after being replaced (step S1201), In other words, the virtual configuration data generating unit 316 generates configuration data corresponding to the image forming apparatus after being replaced as second operation setting information.

Generation processing of virtual configuration data in step S1207 is same as that of virtual configuration data when the image forming apparatus is located (in step S1057 of FIG. 10). Namely, the virtual configuration data generating unit 316 generates virtual configuration data based on virtual device configuration data, the model setting value schema, and tenant configuration data.

Next, the virtual configuration data generating unit 316 comperes virtual device configuration data of the image forming apparatus before being replaced that has been backed up in the storage unit in advance with newly generated virtual device configuration data of the image forming apparatus after being replaced. Then, the virtual configuration data generating unit 316 extracts a difference from device configuration information based on a comparison result (Step S1202). Next, the virtual configuration data generating unit 316 performs following processing with respect to all of setting items of configuration data of target.

Firstly, the virtual configuration data generating unit 316 acquires meta-information associated with virtual configuration data of the image forming apparatus before being replaced. The virtual configuration data generating unit 316 determines whether or not to execute automatic merge processing based on difference information about device configuration information extracted in step S1202 and the handover condition included in the acquired meta-information. Automatic merge processing is processing for automatically handing over, that is, overwriting the setting of virtual configuration data before being replaced with virtual configuration data after being replaced generated in step S1202.

Specific processing in step 1203 will be given. The virtual configuration data generating unit 316 determines the changed content of device configuration information of the image forming apparatus accompanied with replacement of the image forming apparatus based on the difference information of device configuration information. Then, the virtual configuration data generating unit 316 executes following processing based on the determined changed content of device configuration information and the handover condition associated with configuration data before being replaced (first operation setting information). The virtual configuration data generating unit 316 determines whether or not to hand over (execute automatic merge processing) the setting of first operation setting information to setting of second operation setting information for each setting item of configuration data after being replaced (second operation setting information).

For example, when the difference information indicates that the paper feeding and delivering stage structure of the image forming apparatus after being replaced has been changed from that before being replaced, the virtual configuration data generating unit 316 determines not to execute automatic merge processing with respect to the setting item corresponding to the handover condition "None" and "Tray_Bin". Then the process advances to step 1204. While, the virtual configuration data generating unit 316 determines to execute automatic merge processing with respect to the setting item corresponding to the handover condition such as "Force". Then the process advances to step 1207.

In step 1204, the virtual configuration data generating unit 316 determines whether or not the setting value has been changed from the initial value about the setting item of which the virtual configuration data generating unit 316 determined not to execute automatic merge processing with reference to the change flag included in meta-information (step 1204). When the change flag is set, the virtual configuration data generating unit 316 determines that the setting value has been changed from the initial value, that is, resetting is required. Then the process advances to step 1205. When the change flag is not set, the virtual configuration data generating unit 316 determines that the setting value has not been changed from the initial value, that is, resetting is not required. Then the process advances to step 1208.

In step S1205, the virtual configuration data generating unit 316 adds the setting item of which the setting value has been changed from the initial value in a resetting list (step S1205). Next, the virtual configuration data generating unit 316 applies a default value as an initial value of the setting item (step S1206).

In step S1207, the virtual configuration data generating unit 316 executes automatic merge processing (step S1207). In this manner, the operational value of virtual configuration data before being replaced is automatically overwritten and reflected on the setting of virtual configuration data after being replaced generated in step 1202. As a result, configuration data is generated that is applied after replacement.

Next, the virtual configuration data generating unit 316 determines whether or not processing for data of all setting items has been completed (step 1208). When data about setting items to be processed remains, the process returns to step 1203, processing is executed for next setting item (step 1209). When processing for data of all setting item has completed, handover processing of configuration data is ended.

Processing described with reference to FIG. 12 is executed, resulting in a completion of handover processing of virtual configuration data from the image forming apparatus before being replaced to the image forming apparatus after being replaced. At this time, based on the changed content of device configuration information and the determination as to whether or not the user has changed the setting value from the initial value, the setting item determined that resetting is required is picked up in the resetting list. The virtual configuration data acquiring unit 320 transmits configuration data and the resetting list applied to the image forming apparatus 101 after being replaced.

Note that when new setting item is present in only in the image forming apparatus after being replaced, or the setting item of which function is not available due to the software and the like and thus not set even if the setting item is present in the image forming apparatus before being replaced, such setting item may be better to be reconfigured again. The virtual configuration data generating unit 316 may pick up these setting items in the resetting list. Also, when no data of handover source is present, or the difference of configuration information of the devices indicates a change from "no function" to "addition of new function", the virtual configuration data generating unit 316 may add the setting item in the resetting list in a coercive manner regardless of the state of the change flag.

Figure 13:
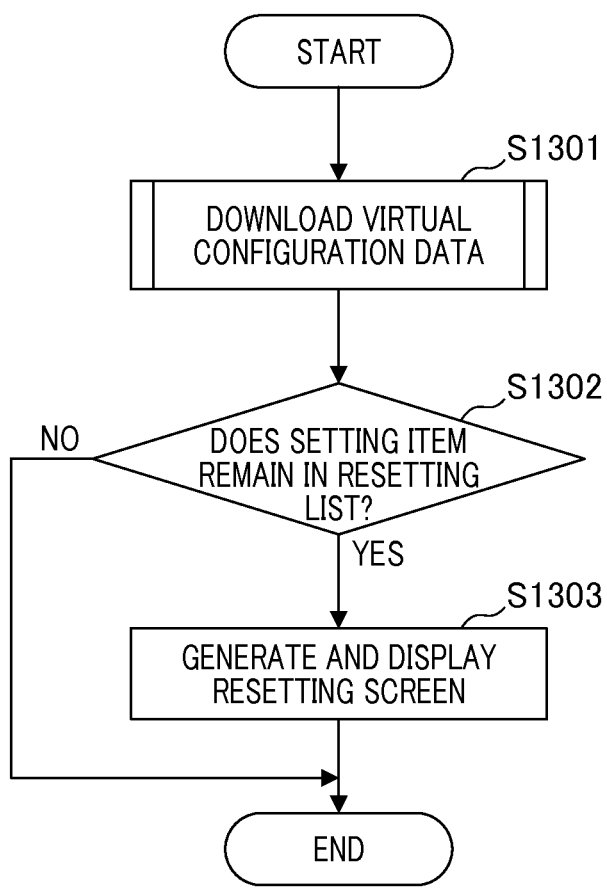
FIG. 13 is a flowchart describing exemplary processing executed by the image forming apparatus when the image forming apparatus is replaced.

FIG. 13 illustrates a flowchart describing an example of processing in which the image forming apparatus executes upon replacement. Specifically, FIG. 13 indicates processing corresponding to processing in step 1007 of FIG. 10 upon replacement.

Firstly, the virtual configuration data receiving unit 303 provided in the image forming apparatus receives (downloads) virtual configuration data from the set value management service 310 (1301). The virtual configuration data receiving unit 303 receives the resetting list as well as virtual configuration data when the resetting data is transmitted in addition to data by the set value management service 310. In other words, virtual configuration data receiving unit 303 functions as a setting information acquisition unit that acquires virtual configuration data and the resetting list applied to the image forming apparatus 101 from virtual configuration data acquiring unit 320 provided in the set value management service 310.

In step 1301, the actual configuration data updating unit 302 further updates actual configuration data with received virtual configuration data. Updated actual configuration data is stored by the actual configuration data holding unit 301.

Next, the actual configuration data updating unit 302 determines whether or not the setting item is present on the resetting list (step 1302). When the setting item is absent on the resetting list, the process is ended. When the setting item is present on the resetting list, the process advances to step 1303.

Next, the user input screen displaying unit 307 functions as a displaying unit. The user input screen displaying unit 307 displays a screen that prompts resetting of the setting item listed on the resetting list (a resetting screen) in the display 205A, and waits for an input of the user (step 1303). Subsequent processing is equivalent to a normal setting change operation by the user. In other words, in addition to updating processing of actual device configuration data, a notification is transmitted by the actual configuration data update notifying unit 308, the actual configuration data update receiving unit 323 receives this notification and thus virtual configuration data is updated.

Figure 14A:
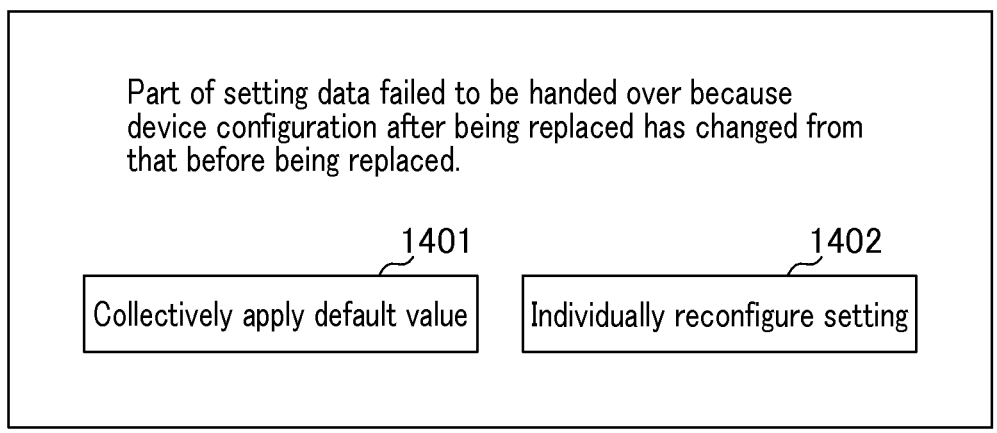
FIG. 14A and FIG. 14B are diagrams illustrating a resetting screen.

FIGS. 14A and 4B are diagrams illustrating an example of a resetting screen. In step 1303 shown in FIG. 13, the user input screen displaying unit 307 firstly displays a screen shown in FIG. 14A. This screen is for selecting the resetting or adoption of the default values all at once. When the user presses down a button 1401, the actual configuration data updating unit 302 adopts the default values collectively with respect to the setting values of the setting item to be reconfigure included in actual configuration data to be updated.

Figure 14B:
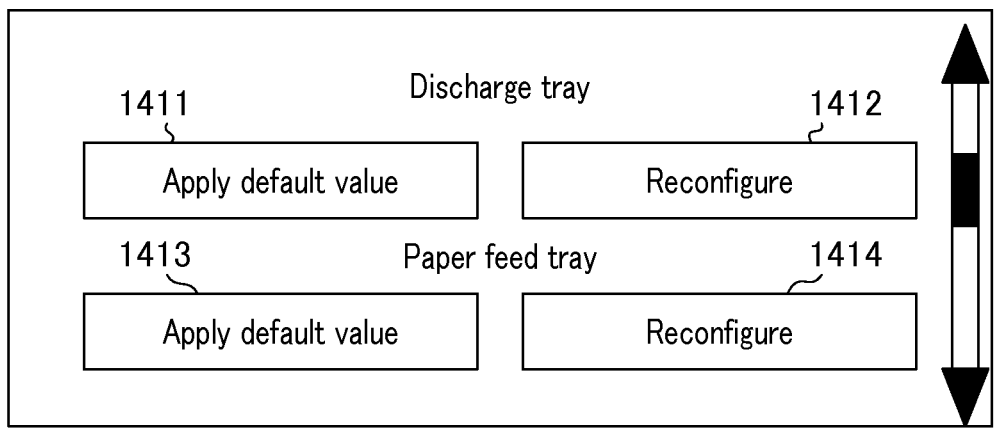

When the user presses down a button 1402, the user input screen displaying unit 307 displays a screen shown in FIG. 14B. This screen is for individually reconfiguring the setting items, and the setting items on the resetting list are displayed. When the user selects a desired setting item for reconfiguring among the displayed setting item list, then presses down any one of buttons 1411 to 1414 to thereby realize individual detail setting.

According to the information processing system of the present embodiment, the user's burden can be reduced by displaying the screen that prompts the resetting about configuration data not appropriate to hand over to the image forming apparatus after being replaced depending on the changed content of device configuration information as a result of replacement of the image forming apparatus.

In the first embodiment, it is assumed that the server computer group 105 realizes the set value management service 310. However, another structure may be employed. For example, one server computer realizes the set value management service 310. Also, the set value management service 310 may be realized in the user environment 100, the service person environment 110, the vender environment 120 of image forming apparatus, or the like.

In the first embodiment, it is assumed that the service person utilizes the terminal device 102B located in the service person environment 110. However, another structure may be employed. For example, a structure in which the service person utilizes terminal device 102A located in the user environment under permission of the user.

Also, the server computers 210A and 210B communicate with each other via the network 220 shown in FIG. 2. However another structure may be employed. For example, the server computers 210A and 210B communicate with each other via the Internet 104.

Also, the actual configuration data holding unit 301 stores actual configuration data in the auxiliary storage device 204A shown in FIG. 3. However another structure may be employed. For example, a structure in which the actual configuration data holding unit 301 temporally stores actual configuration data in the volatile memories 203A may be employed. In this case, since actual configuration data is lost when the power is OFF, the virtual configuration data receiving unit 303 needs to receive virtual configuration data every time the power of the device is ON. As a specific processing, update determination processing in step 1004 is omitted, processing in step 1007 shown in FIG. 10 is always performed.

The actual device configuration data collecting unit 304 shown in FIG. 3 collects actual device configuration data every time the power of the image forming apparatus is ON. However, another structure may be employed. For example, the image forming apparatus may include an actual device configuration data holding unit (not shown) for consistently storing actual device configuration data in the auxiliary storage device 204A. In this case, it is required for promptly rewriting device configuration data held by the actual device configuration data holding unit depending on the change of actual device configuration data. Thus, the actual device configuration data collecting unit 304 monitors the change of actual device configuration data, notifies the actual device configuration data holding unit of the changed content, and reflects the changed content on actual device configuration data when the actual device configuration data collecting unit 304 detects the changed contents. Also, the actual device configuration data notification unit 306 requests actual device configuration data to the actual device configuration data holding unit.

The tenant identifier holding unit 305 shown in FIG. 3 stores the tenant identifier in the tenant identifier auxiliary storage device 204A. However another structure may be employed. For example, a structure in which a user inputs the tenant identifier by using the input device 206A every time may be employed. The timing of the input may be upon activation of the image forming apparatus, or another timing may be available. In this case, the tenant identifier is stored in the volatile memories 203A.

The actual device configuration data notification unit 306 shown in FIG. 3 performs processing when the power of the image forming apparatus is ON. However, another structure may be employed. For example, a structure in which the user instructs acquisition of virtual configuration data by using the input device 206A may be employed. In this case, subsequent processing of step 1002 is performed when the image forming apparatus detects the acquisition instruction of virtual configuration data in step 1001 shown in FIG. 10.

The virtual device holding unit 311 shown in FIG. 3 holds the identifier as shown in FIG. 8 for identifying virtual device configuration data and virtual configuration data. However, another structure may be employed. For example, a structure in which the virtual device holding unit 311 holds substance of data other than the identifier may be employed.

The virtual configuration data generating unit 316 shown in FIG. 3 generates virtual configuration data based on the model setting value schema, tenant configuration data, and virtual device configuration data. However, another structure may be employed. For example, the virtual configuration data generating unit 316 generates virtual configuration data depending on the model based on the model setting value schema and tenant configuration data. In this case, the image forming apparatus refers to actual configuration data depending on device configuration when referring to actual configuration data. Also, a structure in which the virtual configuration data generating unit 316 generates virtual configuration data with additional predetermined license data may be employed. In this case, virtual configuration data accommodated with optional functions provided in the image forming apparatus is generated.

Next, a description will be given of a second embodiment. In the second embodiment the set value management service itself that functions as a server is omitted. In other words, the image forming apparatus itself determines whether or not to hand over configuration data depending on the changed content of device configuration information accompanied with replacement of the image forming apparatus, and displays the screen that prompts the resetting about the setting item required for reconfiguring among setting items determined not to hand over when the image forming apparatus has determined not to hand over configuration data.

Figure 15:
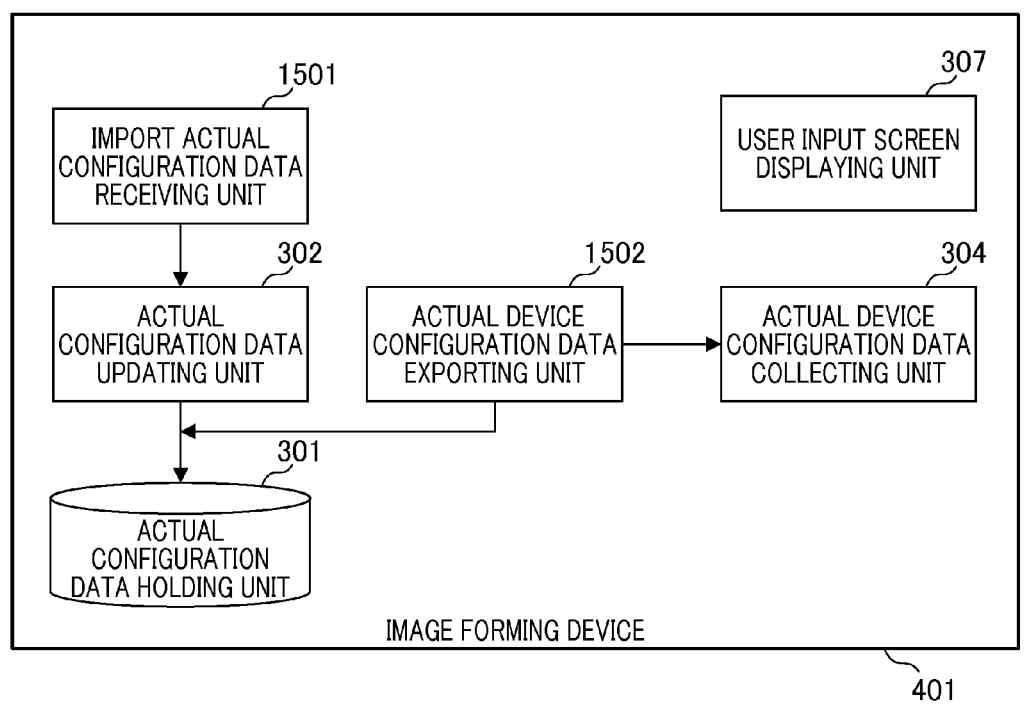
FIG. 15 is an exemplary functional block diagram in a second embodiment.

FIG. 15 is a functional block diagram in the second embodiment. An image forming apparatus 401 shown in FIG. 15 includes the actual configuration data holding unit 301, the actual configuration data updating unit 302, the actual device configuration data collecting unit 304, the user input screen displaying unit 307, an import actual configuration data receiving unit 1501, and an actual device configuration data exporting unit 1502. The actual configuration data holding unit 301 and the actual configuration data updating unit 302 provided in the image forming apparatus 401 are same as the actual configuration data holding unit 301 and the actual configuration data updating unit 302 described with reference to FIG. 3. Similarly, the actual device configuration data collecting unit 304 and the user input screen displaying unit 307 provided in the image forming apparatus 401 are same as the actual device configuration data collecting unit 304 and the user input screen displaying unit 307 described with reference to FIG. 3.

The image forming apparatus 401 is different with the image forming apparatus 101, does not exchange virtual configuration data with the set value management service 310, but imports/exports configuration data from/to the USB memory and the like.

The import actual configuration data receiving unit 1501 receives configuration data held by the external device other than the image forming apparatus. Specifically, the import actual configuration data receiving unit 1501 receives import data via the network communication device 207C (FIG. 2), or the removal storage media 230 (FIG. 2) such as the USB memory. In present embodiment, import data is actual configuration data of the image forming apparatus 401 exported to the external device before the image forming apparatus 401 is replaced. The meta-information shown in FIGS. 11A and 11B is associated with actual configuration data similar to actual configuration data as described in the first embodiment.

The actual configuration data exporting unit 1502 acquires actual configuration data from the actual configuration data holding unit 301, and generates export data. In the present embodiment, export data include actual configuration data of the image forming apparatus before being replaced 401, and actual device configuration data of the image forming apparatus 401. The actual configuration data exporting unit 1502 exports export data to the external device via the network communication device 207A. The actual configuration data exporting unit 1502 exports export data to the removal storage media 230 such as the USB memory.

In other words, the actual configuration data exporting unit 1502 functions as an outputting unit that performs the following processing when the image forming apparatus is replaced. The actual configuration data exporting unit 1502 outputs output information including actual device configuration data of the image forming apparatus before being replaced that has been collected by the actual device configuration data collecting unit 304, and actual configuration data before being replaced held by the actual configuration data holding unit 301 to the external device. Also, the aforementioned import actual configuration data receiving unit 1501 functions as an inputting unit that inputs the output information from the external device to the image forming apparatus after being replaced when the image forming apparatus is replaced.

In the second embodiment, the image forming apparatus before being replaced 401 exports data, and the image forming apparatus 401 after being replaced imports the exported data to thereby perform handover processing of configuration data.

Figure 16:
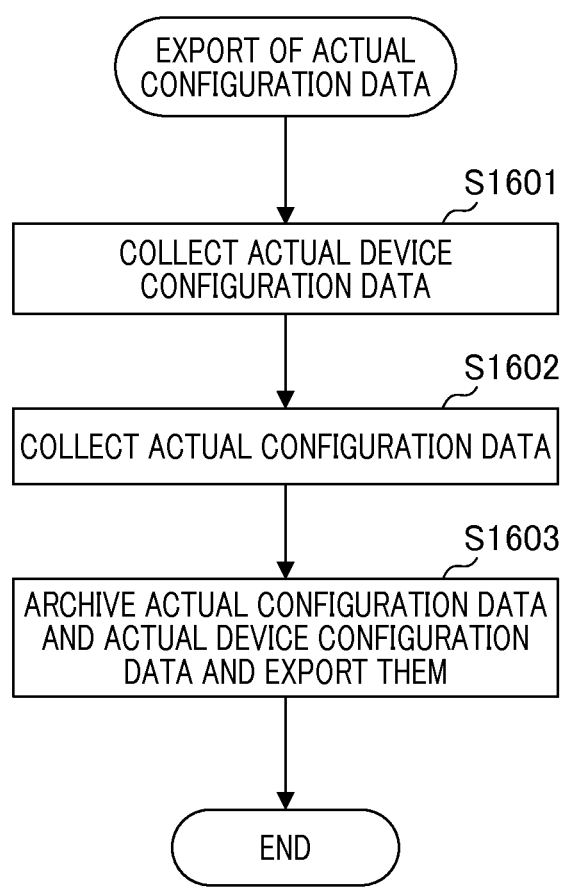
FIG. 16 is a diagram describing an example of an export of actual configuration data.

FIG. 16 is a flowchart describing an example of export of actual configuration data. It is assumed that the image forming apparatus 401 is an object of replacement as a given. Firstly, the actual device configuration data collecting unit 304 collects actual device configuration data of the image forming apparatus 401 in response to an export instruction by a user (step 1601).

Next, the actual configuration data exporting unit 1502 collects actual device configuration data of the image forming apparatus 401 from the actual configuration data holding unit 301 (step 1602). Then, the actual configuration data exporting unit 1502 archives the collected actual device configuration data and the actual configuration data to thereby generate export data, and exports the generated export data to the external device (step 1603).

FIG. 17 is a flowchart describing an example of import processing of actual configuration data. It is assumed the image forming apparatus 401 of which export processing described with reference to FIG. 16 has been completed is replaced as a given.

Firstly, the import actual configuration data receiving unit 1501 imports export data exported to the external device in step 1603 shown in FIG. 16 from the external device. The import actual configuration data receiving unit 1501 acquires device configuration data and actual configuration data included in the imported export data (step S1701). The acquired device configuration data and the actual configuration data are device configuration data and actual configuration data of the image forming apparatus 401 before being replaced.

Next, the actual device configuration data collecting unit 304 collects device configuration data of own device, that is, the image forming apparatus 401 after being replaced (step S1702). Then, the actual configuration data updating unit 302 acquires actual configuration data before being replaced as first operation setting information from the import actual configuration data receiving unit 1501. Also, the actual configuration data updating unit 302 acquires device configuration data before being replaced from the import actual configuration data receiving unit 1501. Also, the actual configuration data updating unit 302 acquires actual configuration data after being replaced held by the actual configuration data holding unit 301 as second operation setting information. Then, the actual configuration data updating unit 302 compares the device configuration data before being replaced with the device configuration data after being replaced, to thereby extract a difference of configuration information of the devices (step S1703). Subsequently, the actual configuration data updating unit 302 performs the following processing about all setting items included in configuration data to be processed.

Firstly, the actual configuration data updating unit 302 acquires meta-information associated with actual configuration data before being replaced. The actual configuration data updating unit 302 determines whether or not to execute automatic merge processing based on the difference information extracted in step S1703 and the handover condition included in the acquired meta-information (step S1704). Determination processing in step S1704 is same as that in step S1203. When the actual configuration data updating unit 302 determines to execute automatic merge processing, the process advances to step 1708. When the actual configuration data updating unit 302 determines not to execute automatic merge processing, the process advances to step S1705.

Subsequently, the image forming apparatus 401 performs processing steps S1706 to S1710. Processing in steps S1706 to S1710 are same as those in steps S1204 to S1209 shown in FIG. 12.

In other words, the actual configuration data updating unit 302 determines whether or not the setting value has been changed from the initial value with reference to the change flag included in the meta-information, with respect to the setting item of which the actual configuration data updating unit 302 determined not to execute automatic merge processing (step S1705). When the actual configuration data updating unit 302 determines that the setting value has been changed from the initial value, the process advances to step S1707. When the actual configuration data updating unit 302 determines that the setting value has not been changed from the initial value, the process advances to step S1706.

In step S1706, the actual configuration data updating unit 302 adds the setting item of which the setting value has been changed from the initial value in the resetting list (step S1706). Subsequently, the actual configuration data updating unit 302 applies a default value as the initial value of the setting item (step S1707).

In step S1708, the actual configuration data updating unit 302 executes automatic merge processing. In this manner, the operational value of actual configuration data before being replaced is automatically rewritten and reflected on actual configuration data after being replaced.

Next, the actual configuration data updating unit 302 determines whether or not processing about data of all setting items has been completed (step S1709). When processing about data of setting item remains, the process returns to step S1704 and processing about next setting item is performed (step S1710). Data of all setting items have been completed, the process advances to step 1711.

Processing in step sS1711 and S1712 are same as those in step S1302 and step S1303 shown in FIG. 13. In other words, the actual configuration data updating unit 302 determines whether or not the setting item remains on the resetting list (step S1711). When the setting item does not remain on the resetting list, the process ends. When the setting item remains on the resetting list, the actual configuration data updating unit 302 instructs the user input screen displaying unit 307 to display the screen that prompts the resetting of the setting item on the resetting list. Then the process advances to step S1712.

Next, the user input screen displaying unit 307 displays the screen that prompts the resetting of the setting item described in the resetting list, and waits for an input of the user (step S1712). Then, the user reconfigures the setting item as necessary.

According to the image forming apparatus 401, the screen that prompts the resetting is displayed as to configuration data inappropriate to hand over to the image forming apparatus after being replaced depending on the changed content of device configuration information accompanied with replacement of the image forming apparatus. Thus, the burden of the user is reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275786 filed Dec. 16, 2011, which is hereby incorporated by reference herein in its entirety.

What is claimed is:

1. An information processing system comprising:
an image forming apparatus; and
a management apparatus that manages operation setting information for switching an operation in the image forming apparatus,
wherein the management apparatus comprises:
 a configuration information acquiring unit configured to acquire device configuration information retained by the image forming apparatus after being replaced from the image forming apparatus via the network and store the device configuration information in a storage unit;
 a generating unit configured to the generate operation setting information for applying to the image forming apparatus; and
 a transmitting unit configured to transmit the generated operation setting information to the image forming apparatus via a network,
 wherein the generating unit:
  generates the operation setting information for applying to the image forming apparatus based on the acquired device configuration information,
  compares the device configuration information, which is included in the image forming apparatus before being replaced and is stored in the storage unit, with the acquired device configuration information after being replaced to thereby determine the changed content of device configuration information accompanied with replacement of the image forming apparatus when the image forming apparatus has been replaced, and
  determines, based on the changed content, for each setting item whether or not to hand over a setting of first operation setting information indicating operation setting information corresponding to the image forming apparatus before being replaced to a setting of second operation setting information indicating operation setting information corresponding to the image forming apparatus after being replaced, and further determines whether or not the setting item not to be handed over to the second operation setting information as a result of the determination is required for a reset, and
 wherein the transmitting unit transmits the generated operation setting information for applying to the image forming apparatus after being replaced and the setting item required for the reset determined by the generating unit to the image forming apparatus after being replaced via the network, and
wherein the image forming apparatus comprises:
 a setting information acquiring unit configured to acquire the operation setting information for applying to the image forming apparatus and the setting item required for the reset from the transmitting unit provided in the management apparatus; and
 a displaying unit configured to display a screen that prompts the reset of the acquired setting item required for the reset.

2. The information processing system according to claim 1, wherein a handover condition as to whether the setting corresponding to the setting item that is corresponding to a changed content of device configuration information is handed over to the operation setting information of the image forming apparatus after being replaced and changing information indicating whether or not a user has changed the setting from an initial value are associated with the operation setting information for each setting item, and
wherein the generating unit determines whether or not to hand over the setting of first operation setting information to the setting of second operation setting information based on the changed content of which the device configuration information is changed and the handover condition associated with the first operation setting information.

3. The information processing system according to claim 2, wherein the generating unit determines whether or not the user has changed the setting from the initial value based on the changing information, and determines that the setting item determined that the user has changed the setting from the initial value is required for the reset.

4. The information processing system according to claim 2, wherein the handover condition includes first instruction information that instructs to reconfigure the setting item regardless of the changed content of the device configuration information, second instruction information that instructs to hand over the setting of first operation setting information to the second instruction information regardless of the changed content of the device configuration information, or third instruction information that instructs to reconfigure the setting item when specific configuration information has been changed.

5. A management method in an information processing system comprising an image forming apparatus and a management apparatus that manages operation setting information for switching an operation in the image forming apparatus, the method comprising:
acquiring, by the management apparatus, device configuration information retained by the image forming apparatus and storing the device configuration information in a storage unit;
generating, by the management apparatus, the operation setting information for applying to the image forming apparatus;
transmitting, by the management apparatus, the generated operation setting information to the image forming apparatus via a network;
comparing, by the management apparatus, the device configuration information, which is included in the image forming apparatus before being replaced and is stored in the storage unit, with the acquired device configuration information after being replaced thereby determining the changed content of device configuration information accompanied with replacement of the image forming apparatus when the image forming apparatus has been replaced;

determining, by the management apparatus, whether or not to hand over a setting of first operation setting information indicating operation setting information corresponding to the image forming apparatus before being replaced to a setting of second operation setting information indicating operation setting information corresponding to the image forming apparatus after being replaced, based on the changed content; and transmitting, by the management apparatus, the generated operation setting information for applying to the image forming apparatus after being replaced to the image forming apparatus after being replaced, in a case that it is determined to hand over a setting of first operation setting information in the determining step.

6. A non-transitory storage medium on which is stored a computer program for making a computer execute a management method in an information processing system comprising an image forming apparatus and a management apparatus that manages operation setting information for switching an operation in the image forming apparatus, the method comprising:

acquiring, by the management apparatus, device configuration information retained by the image forming apparatus and storing the device configuration information in a storage unit;

generating, by the management apparatus, the operation setting information for applying to the image forming apparatus;

transmitting, by the management apparatus, the generated operation setting information to the image forming apparatus via a network;

comparing, by the management apparatus, the device configuration information, which is included in the image forming apparatus before being replaced and is stored in the storage unit, with the acquired device configuration information after being replaced thereby determining the changed content of device configuration information accompanied with replacement of the image forming apparatus when the image forming apparatus has been replaced;

determining, by the management apparatus, whether or not to hand over a setting of first operation setting information indicating operation setting information corresponding to the image forming apparatus before being replaced to a setting of second operation setting information indicating operation setting information corresponding to the image forming apparatus after being replaced, based on the changed content; and transmitting, by the management apparatus, the generated operation setting information for applying to the image forming apparatus after being replaced, in a case that it is determined to hand over a setting of first operation setting information in the determining step, to the image forming apparatus after being replaced.

7. An information processing system comprising:
an image forming apparatus; and
a management apparatus that manages operation setting information for switching an operation in the image forming apparatus,
wherein the management apparatus comprises:
a configuration information acquiring unit configured to acquire device configuration information retained by the image forming apparatus and store the device configuration information in a storage unit;
a generating unit configured to generate the operation setting information for applying to the image forming apparatus; and
a transmitting unit configured to transmit the generated operation setting information to the image forming apparatus,
wherein the generating unit:
compares the device configuration information included in the image forming apparatus before being replaced that is stored in the storage unit with the acquired device configuration information after being replaced to thereby determine the changed content of device configuration information accompanied with replacement of the image forming apparatus when the image forming apparatus has been replaced,
determines, based on the changed content, whether or not to hand over a setting of first operation setting information indicating operation setting information corresponding to the image forming apparatus before being replaced to a setting of second operation setting information indicating operation setting information corresponding to the image forming apparatus after being replaced, and
wherein, in a case that the generating unit determines to hand over a setting of first operation setting information, the transmitting unit transmits the generated operation setting information for applying to the image forming apparatus after being replaced to the image forming apparatus after being replaced.

8. The information processing system according to claim 7, wherein a handover condition as to whether the setting corresponding to the setting item that is corresponding to a changed content of device configuration information is handed over to the operation setting information of the image forming apparatus after being replaced and changing information indicating whether or not a user has changed the setting from an initial value are associated with the operation setting information for each setting item, and wherein the generating unit determines whether or not to hand over the setting of first operation setting information to the setting of second operation setting information based on the changed content of which the device configuration information is changed and the handover condition associated with the first operation setting information.

9. The information processing system according to claim 7, wherein, in a case that the generating unit determines not to hand over the setting of first operation setting information to the setting of second operation setting information, the generating unit determines whether or not reset is required based on the changed content associated with the first operation setting information, and wherein, in a case that the generating unit determines that the reset is required, the transmitting unit transmits information indicating that the reset is required.

10. A management apparatus that manages operation setting information for the image forming apparatus, the management apparatus comprising:
a configuration information acquiring unit configured to acquire device configuration information retained by the image forming apparatus and store the device configuration information in a storage unit;
a generating unit configured to generate the operation setting information for applying to the image forming apparatus; and
a transmitting unit configured to transmit the generated operation setting information to the image forming apparatus, wherein the generating unit:
  compares the device configuration information included in the image forming apparatus before being replaced that is stored in the storage unit with the acquired device configuration information after being replaced to thereby determine the changed content of device configuration information accompanied with replacement of the image forming apparatus when the image forming apparatus has been replaced, and
  determines, based on the changed content, whether or not to hand over a setting of first operation setting information indicating operation setting information corresponding to the image forming apparatus before being replaced to a setting of second operation setting information indicating operation setting information corresponding to the image forming apparatus after being replaced, and
  wherein, in a case that the generating unit determines to hand over a setting of first operation setting information, the transmitting unit transmits the generated operation setting information for applying to the image forming apparatus after being replaced to the image forming apparatus after being replaced.

11. The management apparatus according to claim 10, wherein a handover condition as to whether the setting corresponding to the setting item that is corresponding to a changed content of device configuration information is handed over to the operation setting information of the image forming apparatus after being replaced and changing information indicating whether or not a user has changed the setting from an initial value are associated with the operation setting information for each setting item, and
  wherein the generating unit determines whether or not to hand over the setting of first operation setting information to the setting of second operation setting information based on the changed content of which the device configuration information is changed and the handover condition associated with the first operation setting information.

12. The management apparatus according to claim 10, wherein, in a case that the generating unit determines not to hand over the setting of first operation setting information to the setting of second operation setting information, the generating unit determines whether or not reset is required based on the changed content associated with the first operation setting information, and
  wherein, in a case that the generating unit determines that the reset is required, the transmitting unit transmits information indicating that the reset is required.

* * * * *